US012608694B2

(12) United States Patent
Francis et al.

(10) Patent No.: US 12,608,694 B2
(45) Date of Patent: *Apr. 21, 2026

(54) PROXIMITY DETECTION SYSTEM FOR REQUEST PROCESSING

(71) Applicant: 365 Retail Markets, LLC, Troy, MI (US)

(72) Inventors: Chad Francis, Buckeye, AZ (US); Krishna Vedula, Tampa, FL (US)

(73) Assignee: 365 Retail Markets, LLC, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,247

(22) Filed: Feb. 27, 2023

(65) Prior Publication Data

US 2023/0214807 A1 Jul. 6, 2023

Related U.S. Application Data

(63) Continuation of application No. 16/571,943, filed on Sep. 16, 2019, now Pat. No. 11,593,778.

(60) Provisional application No. 62/734,744, filed on Sep. 21, 2018, provisional application No. 62/732,200, filed on Sep. 17, 2018.

(51) Int. Cl.
| | |
|---|---|
| *G06Q 20/18* | (2012.01) |
| *G06Q 20/32* | (2012.01) |
| *G07C 9/00* | (2020.01) |
| *H04L 67/60* | (2022.01) |
| *H04W 4/021* | (2018.01) |
| *H04L 67/12* | (2022.01) |

(52) U.S. Cl.
CPC ......... *G06Q 20/18* (2013.01); *G06Q 20/3224* (2013.01); *G07C 9/00174* (2013.01); *H04L 67/60* (2022.05); *H04W 4/021* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 10,255,737 B1 | 4/2019 | Eichenblatt | |
| 2007/0035381 A1 | 2/2007 | Davis | |
| 2007/0084913 A1* | 4/2007 | Weston | .............. G06Q 20/3224 235/383 |

(Continued)

*Primary Examiner* — Chris Parry
*Assistant Examiner* — Abderrahmen Chouat
(74) *Attorney, Agent, or Firm* — Young Basile Hanlon & MacFarlane, P.C.

(57) ABSTRACT

A request is processed by a control device based on a detected proximity of a client device to the control device. The control device, which is intermediate to the client device and a beacon device, runs application software that receives the request generated using a client application running at the client device. The beacon device, upon receipt of an indication that the control device received the request, transmits a signal to detect a proximity of the client device to the control device. The application software receives data indicative of a response to the signal from the beacon device. The application software allows the request upon a determination that the data reflects the response is received. Alternatively, the application software allows the request upon a determination that the data indicates that the proximity of the client device to the control device satisfies a threshold.

18 Claims, 13 Drawing Sheets

(56)     References Cited

U.S. PATENT DOCUMENTS

| | | | |
|---|---|---|---|
| 2010/0290069 A1 | 11/2010 | Hirose | |
| 2013/0132307 A1 | 5/2013 | Phelps et al. | |
| 2014/0188733 A1 | 7/2014 | Granbery | |
| 2017/0148243 A1* | 5/2017 | Shin | G07C 9/00309 |
| 2017/0178104 A1* | 6/2017 | Fernandez | G06Q 30/0281 |
| 2018/0144322 A1* | 5/2018 | Unnerstall | G07F 13/025 |
| 2018/0262891 A1 | 9/2018 | Wu et al. | |
| 2019/0073845 A1* | 3/2019 | Ives-Halperin | H04W 4/80 |
| 2019/0172331 A1 | 6/2019 | Hall | |
| 2020/0005229 A1* | 1/2020 | Durkee | G06Q 10/087 |
| 2020/0074440 A1* | 3/2020 | Fullman | G06Q 20/28 |
| 2021/0166224 A1 | 6/2021 | Mars et al. | |
| 2021/0166234 A1* | 6/2021 | Anderson | G06Q 20/10 |

* cited by examiner

BEACON DEVICE
900

INTERMEDIARY
CONTROL DEVICE
902

CLIENT DEVICE
904

SERVICE REQUEST

906

908

PROXIMITY DETECT
COMMAND

910

BEACON SIGNAL

SIGNAL RESPONSE

912

914

PROXIMITY DATA

916

PROXIMITY
VERIFICATION

SERVICE REQUEST
PROCESSING

918

SERVICE RESPONSE

920

SECURED COMPARTMENT 1000

INTERMEDIARY CONTROL DEVICE 1002

CLIENT DEVICE 1004

SERVICE REQUEST

1006

1008

SERVICE REQUEST PROCESSING

1010

ACCESS GRANTED

ACCESS MONITORING

1012

ACCESS TERMINATED

1014

PROCESSING COMPLETION

1016

SERVICE RESPONSE

1018

1100

1102 — TRANSMIT SIGNAL FROM BEACON DEVICE

1104 — RECEIVE SIGNAL RESPONSE FROM CLIENT DEVICE

1106 — RECEIVE SERVICE REQUEST

1108 — VERIFY PROXIMITY OF CLIENT DEVICE

1110 — PROCESS SERVICE REQUEST BASED ON PROXIMITY

1112 — OUTPUT RESPONSE

1200

1202 — RECEIVE REQUEST

1204 — TRANSMIT COMMAND TO BEACON DEVICE

1206 — RECEIVE PROXIMITY DATA FROM BEACON DEVICE

1208 — DETERMINE PROXIMITY OF CLIENT DEVICE

1210 — PROCESS REQUEST BASED ON PROXIMITY

1212 — OUTPUT RESPONSE

1300

1302 — RECEIVE SERVICE REQUEST

1304 — GRANT ACCESS TO SECURED COMPARTMENT

1306 — MONITOR ACCESS TO SECURED COMPARTMENT

1308 — DETERMINE USER ACTION OCCURRED

1310 — TERMINATE ACCESS TO SECURED COMPARTMENT

1312 — OUTPUT RESPONSE

PROXIMITY DETECTION SYSTEM FOR REQUEST PROCESSING

CROSS REFERENCE TO RELATED APPLICATIONS

This application is a continuation of U.S. application Ser. No. 16/571,943, filed Sep. 16, 2019, which claims the benefit of U.S. Provisional Application No. 62/732,200, filed Sep. 17, 2018, and U.S. Provisional Application No. 62/734, 744, filed Sep. 21, 2018, the disclosures of which are hereby incorporated by reference in their entirety.

TECHNICAL FIELD

This disclosure relates to a proximity detection system for request processing.

BACKGROUND

Connected systems are used to facilitate transactions, such as by transmitting, receiving, and processing requests. A device of a connected system may receive a request from a remote device, such as by using wireless communications. The device processes the request and transmits a response to the remote device to reflect whether the request is allowed or denied. In one example, such request processing functionality may be used for processing transactions within a self-service market environment.

SUMMARY

Disclosed herein are, inter alia, implementations of systems and techniques for request processing based on proximity detection.

In an implementation, a system for controlling a processing of a request from a client device based on a proximity of the client device to an intermediary control device is disclosed. The system comprises an intermediary control device, a beacon device, and a secured compartment. The beacon device is in communication with the intermediary control device and transmits a signal configured for receipt by the client device. The secured compartment includes a locking mechanism in communication with the intermediary control device. The intermediary control device includes a memory and a processor. The memory stores first instructions and second instructions. The processor is configured to execute the first instructions to run application software. The processor is configured to execute the second instructions to: receive, from the beacon device, proximity data indicative of the proximity of the client device to the intermediary control device, wherein the proximity data is generated responsive to the signal transmitted from the beacon device; receive, from the client device, the request, wherein the request is associated with functionality of the application software and corresponds to an item within the secured compartment; verify, based on the proximity data, whether the proximity of the client device to the intermediary control device meets a threshold range; responsive to verifying that the proximity of the client device to the intermediary control device meets the threshold range, process the request using the application software including by transmitting, to the secured compartment, a command configured to unlock the locking mechanism of the secured compartment, wherein the unlocking of the locking mechanism grants access to the secured compartment for retrieval of the item; and responsive to processing the request, transmit, to the client device, a response indicating the processing of the request.

In another implementation, a system for controlling a processing of a request from a client device based on a proximity of the client device to an intermediary control device is disclosed. The system comprises an intermediary control device and a secured compartment. The secured compartment includes a locking mechanism in communication with the intermediary control device. The intermediary control device includes a memory and a processor. The memory stores first instructions and second instructions. The processor is configured to execute the first instructions to run application software. The processor is configured to execute the second instructions to: receive, from the client device, the request, wherein the request is associated with functionality of the application software and corresponds to an item within the secured compartment; process the request using the application software including by: transmitting, to the secured compartment, a command configured to unlock the locking mechanism of the secured compartment, wherein the unlocking of the locking mechanism grants access to the secured compartment for retrieval of the item; and monitoring the access to the secured compartment while the locking mechanism remains unlocked; and responsive to processing the request, output a response indicating the processing of the request.

In yet another implementation, a system for controlling a processing of a request from a client device based on a proximity of the client device to an intermediary control device is disclosed. The system comprises an intermediary control device and a secured compartment. The intermediary control device including a memory and a processor. The memory stores first instructions and second instructions. The processor is configured to execute the first instructions to run application software. The processor of the intermediary control device is configured to execute the second instructions to: receive, from the client device, the request, wherein the request is associated with functionality of the application software and corresponds to an item within a secured compartment in communication with the intermediary control device; verify a near proximity of the client device to the intermediary control device; and, responsive to the verification of the near proximity of the client device to the intermediary control device, cause a locking mechanism of a secured compartment within which the item is located to unlock for a period of time to allow access to the item.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

In a connected system, a user of a remote device may connect with a control device of the connected system to process a transaction. For example, application software running on the remote device may establish wireless communication with application software running on the control device. The established wireless communication may then be used for the transaction. For example, where the connected system is or otherwise includes a self-service market environment, the wireless communication between the remote device and the control device may be used to complete a self-service market transaction.

Depending on the nature of the wireless communication, the remote device may not be proximate to the control device when the wireless communication is established. In one example, where the connected system utilizes Wi-Fi, the wireless communication may be established even where the remote device and the control device are some distance from one another, provided they are each able to connect to the particular Wi-Fi network.

However, there may be issues arising from enabling the processing of a transaction between a remote device and a control device that are not proximate to one another. For example, where multiple control devices are connected to a single Wi-Fi or like network, the user of the remote device may process a transaction using a different control device than intended. In another example, an unauthorized user may use the remote device to process a transaction without the knowledge of the authorized user, such as by completing the transaction from a distance at a first time and retrieving the transacted-for product from the vicinity of the control device at a second time.

Implementations of this disclosure address problems such as these by controlling the processing of a transaction with a control device based on a proximity of a remote device (e.g., a client device) to the control device. The control device, which is intermediate to the client device and a beacon device used for the proximity detection, runs application software that receives the request generated using a client application running at the client device. The beacon device transmits a signal to detect a proximity of the client device to the control device. The application software receives data indicative of a response to the signal from the beacon device. The application software allows the request upon a determination that the data indicates that the response is received. Alternatively, the application software allows the request upon a determination that the data indicates that the client device is within a near proximity of the control device.

Figure 1:
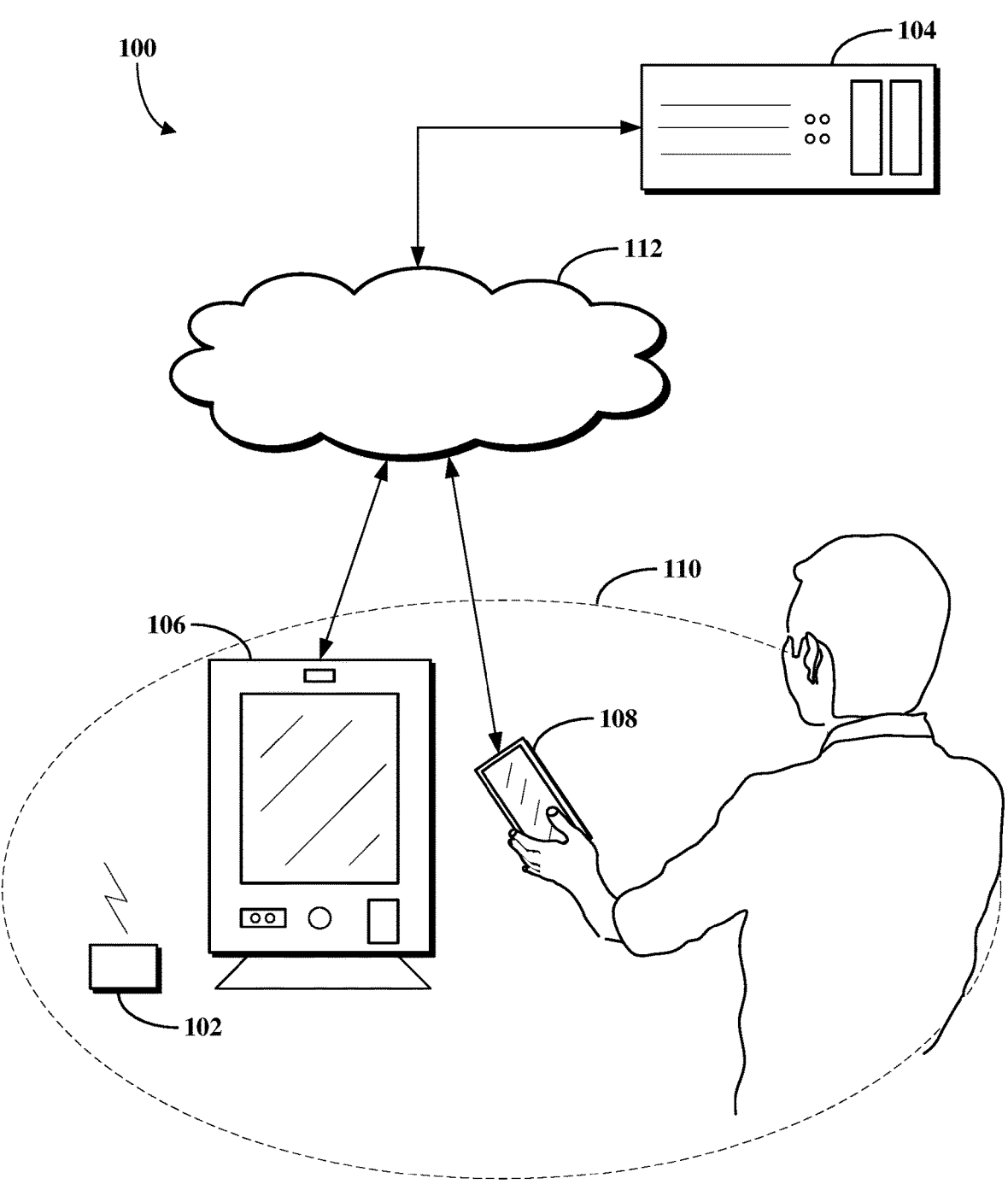
FIG. 1 is a block diagram of an example of a system for request processing based on proximity detection.

To describe some implementations in greater detail, reference is first made to examples of hardware structures which may be used. FIG. 1 is a block diagram of an example of a system 100 for request processing based on proximity detection. The system 100 includes a beacon device 102, a server device 104, and an intermediary control device 106.

The beacon device 102 is a device used to detect the proximity of another device, such as a client device 108, to the intermediary control device 106. The beacon device 102 includes a wireless network component, which may, for example, use Bluetooth®, Bluetooth® Low Energy (BLE), radio frequency identification (RFID), or other wireless connection functionality. For example, the beacon device 102 can detect whether the client device 108 is within a range 110 proximate to the intermediary control device 106, such as by transmitting a signal within the range 110 and listening for a response to the signal. The beacon device 102 may be plugged into and draw power from the intermediary control device 106. Alternatively, the beacon device 102 may be plugged into and draw power from a source nearby to the intermediary control device 106 (e.g., an outlet or another computing device).

The server device 104 is a computing device that hosts server-side application software and stores information used by the server-side application software and related application software (e.g., client-side application software running on the client device 108). The server device 104 may include an application server and/or a database server. The server device 104 may be a server located in a rack, such as of a data center. Alternatively, the server device 104 may represent a server within a same location as the intermediary control device 106.

The intermediary control device 106 is a computing device located proximate to the beacon device 102. The intermediary control device 106 is intermediate to the beacon device 102 and the client device 108 in that requests and other data processed between the beacon device 102 and the client device 108 (e.g., client-side application software running on the client device 108) are processed through the intermediary control device 106. Similarly, requests and other data processed between the server device 104 and the client device 108 (e.g., the client-side application software) are processed through the intermediary control device 106.

The intermediary control device 106 communicates with the server device 104 over a network 112. The network 112 may, for example, be a local area network, a wide area network, a machine-to-machine network, a virtual private network, or another public or private network. For example, application software running on the intermediary control device 106 may be configured, deployed, or otherwise run on the intermediary control device 106 based on instructions, commands, or other data received from the server device 104 over the network 112.

The client device 108 is a device separate from the intermediary control device 106 and which can receive a signal from and transmit a response to the beacon device 102. For example, the client device 108 may be a mobile device, such as a smart phone, tablet, laptop, wearable device, or the like. The client device 108 runs application software (e.g., client-side application software) used to communicate with the intermediary control device 106.

The system 100 includes functionality for processing a request based on a proximity of the client device 108 to the beacon device 102. In one example, the system 100 may refer to a system for processing transactions within a self-service market environment. The intermediary control device 106 may be a kiosk device running point of sales software that interfaces with a client application running on the client device 108. A user of the client device 108 may use the client application to log into a personal account for the self-service market, such as directly at the intermediary control device 106 or at the client device 108. The intermediary control device 106 may control the ability of the client application to initiate, continue, complete, or otherwise process a transaction for goods of the self-service market based on information received from the beacon device 102.

For example, upon the intermediary control device 106 receiving a request for a transaction (e.g., from the client device 108 or from application software running at the intermediary control device 106), the intermediary control device 106 can cause the beacon device 102 to transmit a signal to determine whether the client device 108 is within the range 110 of the intermediary control device 106. Where the client device 108 is within the range 110 of the intermediary control device 106, the beacon device 102 receives a response to the signal and indicates the response to the intermediary control device 106. The indication of the response causes the intermediary control device 106 to allow the request to be processed. However, where the client device 108 is not within the range 110 of the intermediary control device 106, the lack of response causes the intermediary control device 106 to deny the request.

Implementations of the system 100 may differ from what is shown and described with respect to FIG. 1. In some implementations, the beacon device 102 may be a device internal to the intermediary control device 106. For example, the beacon device 102 may represent a Bluetooth®, BLE, radio frequency (RF), or other component of the intermediary control device 106. In such an implementation, the system 100 may omit a device external to the intermediary control device 106 for controlling the processing of requests and other data between the client device 108 and the intermediary control device 106. In some implementations, the system 100 may omit the server device 104.

In some implementations, the requests and other data processed between the beacon device 102 and the client device 108 (e.g., application software running on the client device 108) may not be processed through the intermediary control device 106. For example, the application software running on the client device 108 may include permissions for using a network interface or other component of the client device 108 to communicate directly with or otherwise transmit data directly to or receive data directly from the beacon device 102 without routing through the intermediary control device 106.

In some implementations, the system 100 may include one or more secured compartments (not shown). For example, a secured compartment may refer to a physical unit within which one or more items may be stored and which may be secured, such as to prevent unauthorized access.

Examples of secured compartments include, without limitations, lockable pantries, lockable refrigerators, lockable freezers, lockable drawers, lockable shelves, lockable desks, lockable cabinets, and lockable tables.

Processing a request using the system 100 may include controlling access to a secured compartment. For example, a request to process using the intermediary control device 106 may be a request for an item located within a secured compartment. The intermediary control device 106 may process the request to, in relevant part, unlock the secured compartment, such as to allow a user of the client device 108 to retrieve the item from the secured compartment. After the item has been retrieved, or after a threshold amount of time in the event the retrieval has not occurred, the secured compartment may be locked again.

In some implementations, the client device 108 may be a device other than a computing device. For example, the client device 108 may be a device including a component that stores and/or transmits data. For example, the client device 108 may be a key fob, a badge, a key, a card, or another physical component. In some such implementations, the client device 108 may transmit data indicative of a user account associated with, and/or an identity of, a user of the intermediary control device 106 by direct physical contact with the intermediary control device 106. For example, the client device 108 may have readable media which may be scanned by or inserted within a portion of the intermediary control device 106 or an associated device. In other such implementations, the client device 108 may transmit the data indicative of the user account and/or the identity without requiring direct physical contact with the intermediary control device 106. For example, the client device 108 may use near-field communication (NFC), Bluetooth®, BLE, RFID, or other wireless connection functionality.

In some implementations, there may be multiple intermediary control devices within a particular physical area. For example, there may be a number of intermediary control devices that each process requests for different items or with respect to different secured compartments. In such an implementation, there may be one beacon device for each intermediary control device. Alternatively, there may be one beacon device shared by some or all of the multiple intermediary control devices. For example, the signal transmitted from a beacon device may include an identifier associated with the beacon device and/or a particular intermediary control device. Processing a request based on a response to that signal may include checking the identifier associated with the signal to determine which intermediary control device to use for the request processing. The identifier may, for example, indicate an identifier representative of an intermediary control device and/or beacon device, a location of the intermediary control device and/or beacon device, or both.

In some implementations, the beacon device 102 may be omitted. For example, where a near proximity between the client device 108 and the intermediary control device 106 is necessary to transmit the request to the intermediary control device 106 (e.g., where the client device 108 uses direct physical contact or short range wireless functionality to interface with the intermediary control device 106), the client device 108 may directly communicate the request to the intermediary control device 106.

Figure 2:
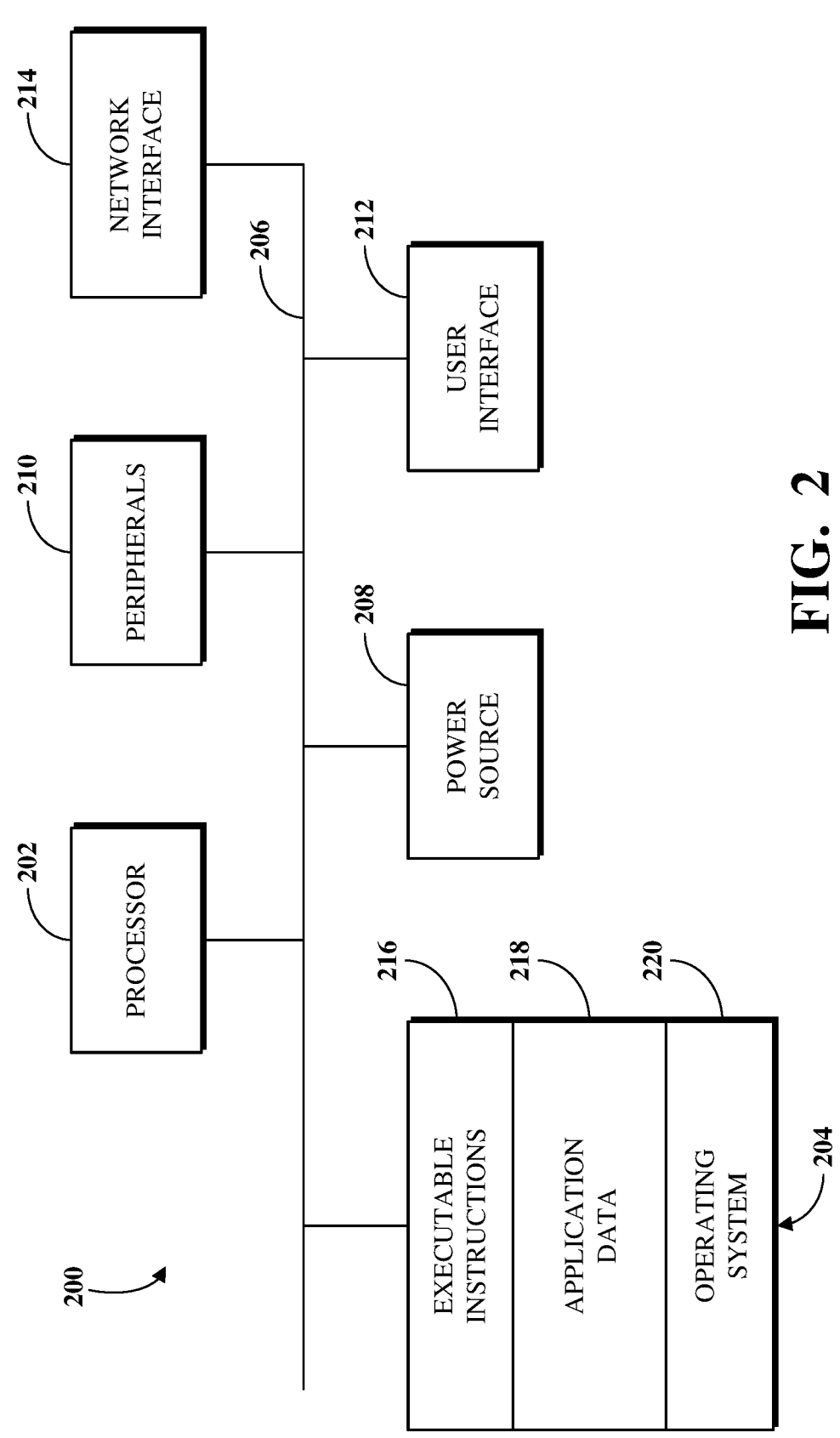
FIG. 2 is a block diagram of an example of an internal configuration of a computing device of a system for request processing based on proximity detection.

FIG. 2 is a block diagram of an example of an internal configuration of a computing device 200 of a system for request processing based on proximity detection, such as the system 100 shown in FIG. 1. The computing device 200 may, for example, be one of the server device 104, the intermediary control device 106, or the client device 108 shown in FIG. 1. The computing device 200 includes components or units, such as a processor 202, a memory 204, a bus 206, a power source 208, peripherals 210, a user interface 212, and a network interface 214. One of more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in any manner, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. The operating system 220 can be, for example, Microsoft Windows®, Mac OS X®, or Linux®; an operating system for a small device, such as a smartphone or tablet device; or an operating system for a large device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network, for example, a local area network, a wide area network, a machine-to-machine network, a virtual private network, or another public or private network. The network interface 214 can be a wired network interface or a wireless network interface. The computing device 200 can communicate with other devices via the network interface 214 using one or more network protocols, such as using Ethernet, TCP, IP, power line communication, Wi-Fi, Bluetooth®, infrared, GPRS, GSM, CDMA, Z-Wave, ZigBee, another protocol, or a combination thereof.

Implementations of the computing device 200 may differ from what is shown and described with respect to FIG. 2. In some implementations, the computing device 200 can omit the peripherals 210. In some implementations, the memory 204 can be distributed across multiple devices. For example, the memory 204 can include network-based memory or memory in multiple clients or servers performing the operations of those multiple devices. In some implementations, the application data 218 can include functional programs, such as a web browser, a web server, a database server, another program, or a combination thereof.

Figure 3:
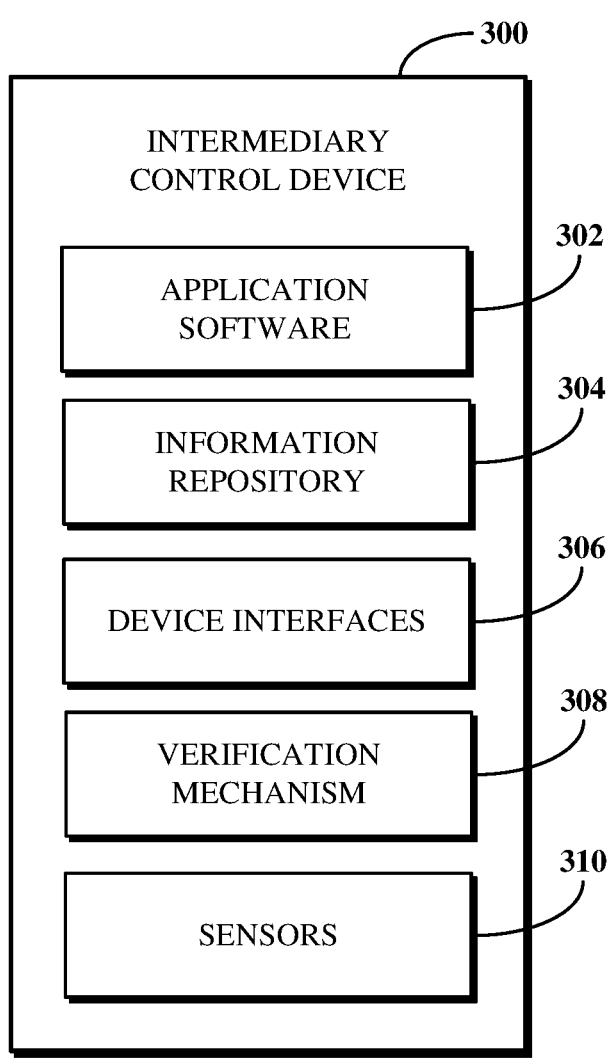
FIG. 3 is a block diagram of an example of software mechanisms of an intermediary control device.

FIG. 3 is a block diagram of an example of software mechanisms of an intermediary control device 300, which may, for example, be the intermediary control device 106 shown in FIG. 1. The software mechanisms of the intermediary control device 300 include application software 302, an information repository 304, device interfaces 306, a verification mechanism 308, and sensors 310.

The application software 302 is software for receiving and processing requests, such as requests received from a client device (e.g., the client device 108 shown in FIG. 1). For example, the application software 302 may be software for facilitating transactions in connection with a user account of a market system. The application software 302 may include point-of-sales functionality, such as to identify a product for a subject transaction (e.g., using an information look-up, scanning, or other mechanism), determine inventory information for the product, and/or verify user account information necessary for completing the subject transaction (e.g., based on a funding amount of the user account).

The information repository 304 is a database software layer that communicates with a database or other data store in connection with the processing of a request, such as a request received from the client device. For example, the database or other data store may be stored locally at the intermediary control device 300. In another example, the database or other data store may be stored remotely, such as at a server device (e.g., the server device 104 shown in FIG. 1). The information repository 304 uses input parameters received from the application software 302 to query to database or other data store.

For example, a request received by the application software 302 can include a request to log into a user account. The application software 302 can provide parameters received as input as part of the request (e.g., a username and password combination) to the information repository 304. The information repository 304 can use those parameters to query a database or other data store to verify the combination before the application software 302 allows access to the user account. In another example, the request received by the application software 302 can include a request for a transaction. The application software 302 can provide the input parameters of the request (e.g., data indicative of a product to transact for) to the information repository 304. The information repository 304 can query the database or other data store using the input parameters before the application software 302 processes the transaction.

The device interfaces 306 may include software (e.g., drivers) used to interface hardware components of the intermediary control device 300 with external devices. The device interfaces 306 may also or instead include hardware (e.g., physical ports and related circuitry) used to interface with the external devices. For example, the device interfaces 306 can include a network interface and driver, as necessary, for facilitating wireless communications between the intermediary control device 300 and other devices of a system associated with the intermediary control device (e.g., a beacon device, a secured compartment, a server device, or the like). In another example, the device interfaces 306 may include circuitry and/or software for peripherals used by the application software 302, such as a barcode scanner, a funds dispenser, a biometric sensor, a card reader, or the like or a combination thereof.

The verification mechanism 308 is software for verifying a near proximity of a client device to the intermediary control device 300. After the application software 302 receives a request from the client device, the application software 302 indicates the request to the verification mechanism 308. The verification mechanism 308 then transmits a command to a beacon device to cause the beacon device to detect a proximity of the client device to the intermediary control device 300 (e.g., using the device interfaces 306).

The verification mechanism 308 subsequently receives a response from the beacon device indicating whether the client device was detected within a range (e.g., the range 110 shown in FIG. 1) of the intermediary control device 300. The verification mechanism 308 then transmits data indicative of the response received from the beacon device to the application software 302. The application software 302 uses that data from the verification mechanism 308 to determine whether to allow or deny the request from the client device. For example, the application software 302 can determine to allow the request from the client device by verifying that the data indicates that the client device is within the range of the intermediary control device 300.

The sensors 310 include one or more sensors used to detect information and/or actions associated with transactions processed using the intermediary control device 300. For example, the sensors 310 may include a camera for capturing images and/or video of a physical area in which the intermediary control device 300 is located. In another example, the camera may be used to capture images and/or video of user interactions with other components within that physical area.

For example, the sensors 310 may be used to monitor user access to a secured compartment associated with the intermediary control device. The secured compartment may become unlocked during a transaction processed using the intermediary control device 300. The sensors 310 may monitor user interaction with the secured compartment while it is unlocked (and/or before and/or after such unlocking), such as to record that a user action taken with respect to the secured compartment is consistent with a service request associated with the transaction. For example, where the service request is for a consumable product stored within the secured compartment, the transaction can include unlocking the secured compartment to allow a purchaser to retrieve that consumable product therefrom. The sensors 310 may thus monitor the purchaser as he or she retrieves the consumable product, such as to determine whether a different product was instead taken, whether multiple products were taken, or whether the purchaser did not take the product at all.

Alternatively, the sensors 310 can be used to record information about the person interacting with the intermediary control device 300. For example, a camera included in the sensors 310 can be used to capture an image and/or a video during a transaction processed using the intermediary control device 300. The image and/or video may be uploaded to a database for further processing, such as to verify that the person is in fact the holder of the account used to complete the transaction with the intermediary control device 300. For example, the sensors 310 may be used for facial recognition purposes, such as to authenticate the user of the intermediary control device 300 prior to completing a transaction requested by that user.

Other examples of the sensors 310 may be used. For example, the sensors 310 may include an accelerometer and/or gyroscope for monitoring a movement of the intermediary control device 300. For example, an unexpected motion of the intermediary control device 300 may be detected using the sensors 310. The device interfaces 306 may then be used to transmit a notification to a computing device, such as to alert an administrator or other person as to the detected motion.

In yet another example, the sensors 310 may include temperature sensors for monitoring an internal operating temperature of the intermediary control device 300, an internal temperature of a secured compartment, or both. For example, the sensors 310 may detect that the intermediary control device 300 is overheating or that a secured compartment is not at a low enough temperature (e.g., where the secured compartment is a locked refrigerator or a locked freezer). The device interfaces 306 may then be used to transmit a notification to a computing device, such as to alert an administrator or other person as to the detected temperature.

Implementations of the software mechanisms of the intermediary control device 300 may differ from what is shown and described with respect to FIG. 3. In some implementations, the verification mechanism 308 may be included within the application software 302. For example, the application software 302 may include the functionality of the verification mechanism 308 such that the verification based on the signal response from the beacon device is processed by the application software 302. In some implementation, one or both of the information repository 304 or the device interfaces 306 may also or instead be included in the application software 302.

In some implementations, the verification mechanism 308 can determine to allow or deny a request received from the client device. For example, the verification mechanism 308 can process a response received from the beacon device to determine whether the client device is within the range of the intermediary control device 300. In such an implementation, the verification mechanism 308 is configured with information indicative of the range, for example, a threshold value representing a maximum distance the client device can be from the intermediary control device 300 for the request to be allowed.

In some implementations, the intermediary control device 300 may include a display. For example, the display can show information processed by the intermediary control device 300, such as based on a request received from application software running on a client device proximate to the intermediary control device 300. A user of the client device can monitor the display of the intermediary control device 300 for status or other information with respect to the request. In another example, such as where the display includes a touch screen, the display may be used by the user of the client device to complete the request. For example, the user of the client device may enter information associated with his or her user account (e.g., as stored using the information repository 304) directly to the intermediary control device 300 through the touch screen interface thereof. The application software 302 can output data for display at the display using the device interfaces 306.

In some implementations, the verification mechanism 308 receives the response indicating that the client device was detected within the range directly from the client device. For example, in that the response itself may be an indication that a signal transmitted from the beacon device was received at the client device, the verification mechanism 308 can verify the proximity of the client device to the intermediary control device 300 without receiving data or information from the beacon device.

Figure 4:
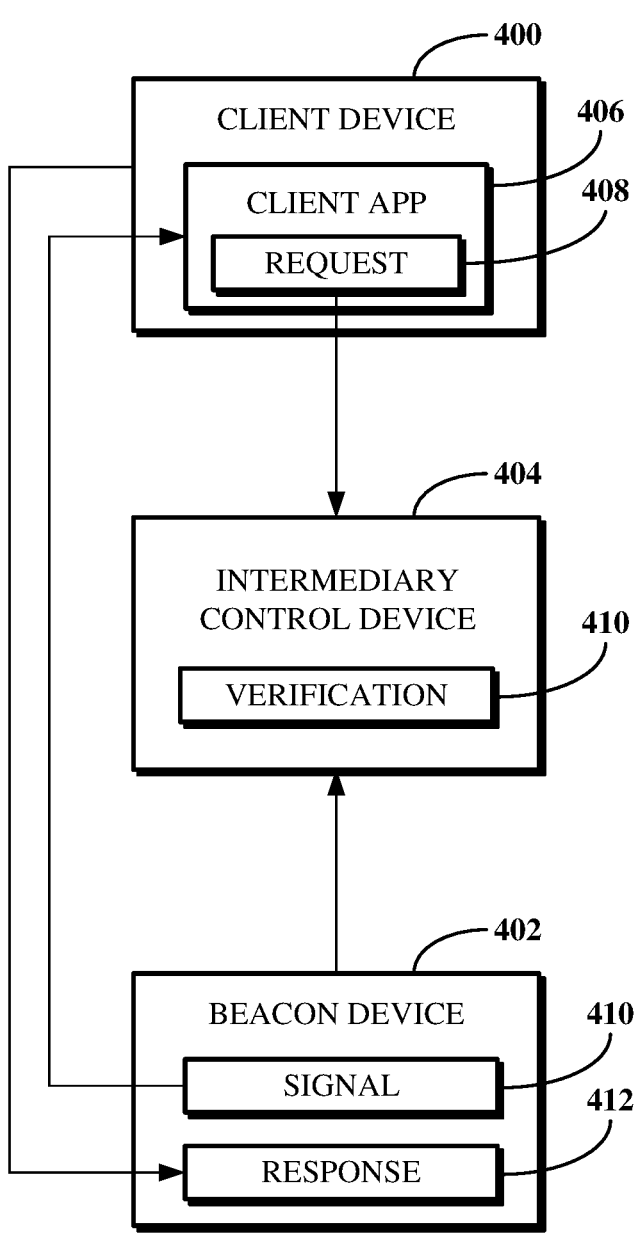
FIG. 4 is a block diagram of an example of communications between a client device, a beacon device, and an intermediary control device.

FIG. 4 is a block diagram of an example of communications between a client device 400, a beacon device 402, and an intermediary control device 404, which may, for example, respectively be the client device 108, the beacon device 102, and the intermediary control device 106 shown in FIG. 1. The client device 400 runs a client application 406. The client application 406 may, for example, include software for processing a transaction with the intermediary control device 404. As part of such a transaction, the client application 406 is used to generate a request 408 that is transmitted to the intermediary control device 404. Processing the transaction using the intermediary control device 404 includes processing the request 408 to complete the some or all of the transaction.

The beacon device 402 transmit a signal 410, such as a Bluetooth®, BLE, RF, or other wireless signal that can be received by the client device 400. The beacon device 402 may constantly (e.g., continuously or periodically, such as per a time interval) transmit the signal 410. The signal 410 may be transmitted within a defined proximity of the intermediary control device 404. As such, the transmission of the signal 410 may be received when another device, for example, the client device 400, is located within that defined proximity of the intermediary control device 404. Thus, the client device 400 may generate and transmit a response 412 to the signal 410 upon the client device 400 receiving the signal 410, such as by the client device 400 entering the defined proximity (e.g., the range 110 shown in FIG. 1).

In response to the response 412, the beacon device 402 transmits data indicative of the response 412 to the intermediary control device 404, such as to enable the client device 400 to transmit the request 408 to the intermediary control device 404. Alternatively, in response to the response 412, the beacon device 402 may transmit data to the client device 400 to enable the client device 400 to transmit the request 408 to the intermediary control device 404. The intermediary control device 404 uses the data indicative of the response 412 to allow or deny the request 408.

Implementations of the communications between the client device 400, the beacon device 402, and the intermediary control device 404 may differ from what is shown and described with respect to FIG. 4. In some implementations, the signal 410 may be transmitted from the beacon device 402 responsive to the request 408. For example, the intermediary control device 404 may receive the request 408 from the client device 400 before the signal 410 is transmitted by the beacon device 402. After receiving the request 408, the intermediary control device 404 then transmit a command to the beacon device 402 to cause the beacon device 402 to transmit the signal 410. Upon receipt of the signal 410 by the client device 400 or shortly thereafter, the client device 400 generates the response 412.

In some such implementations, the beacon device 402 receives the response 412 and then transmits data indicating that the response 412 was received to the intermediary control device 404. In other such implementations, the intermediary control device 404 receives the response 412 from the client device 400. After the intermediary control device 404 receives the response 412 or data indicating that the response 412 was received (e.g., by the beacon device 402), the intermediary control device 404 processes the request 408.

In some implementations, the request 408 may include a request to use application software of the intermediary control device 404 or to communicate data with the intermediary control device 404. For example, the request 408 may be transmitted upon the client device 400 starting to run the client application 406. For example, one of the initial operations involved in running the client application 406 may be to request that a connection be established between the client application 406 and the application software running on the intermediary control device 404. In such an implementation, the intermediary control device 404 can allow the request 408 by establishing the connection upon receipt of the response 412 from the beacon device 402.

In some implementations, processing the request 408 can include verifying that the request 408 is to be processed using the intermediary control device 404. For example, the intermediary control device 404 may be one of a number of intermediary control devices within a physical area. The beacon device 402 can include within the signal 410 an identifier of the intermediary control device 404 and/or of the beacon device 402 itself, such as to identify the particular intermediary control device to use for processing the request 408. The response 412 further indicates the identifier from the signal 410.

Figure 5:
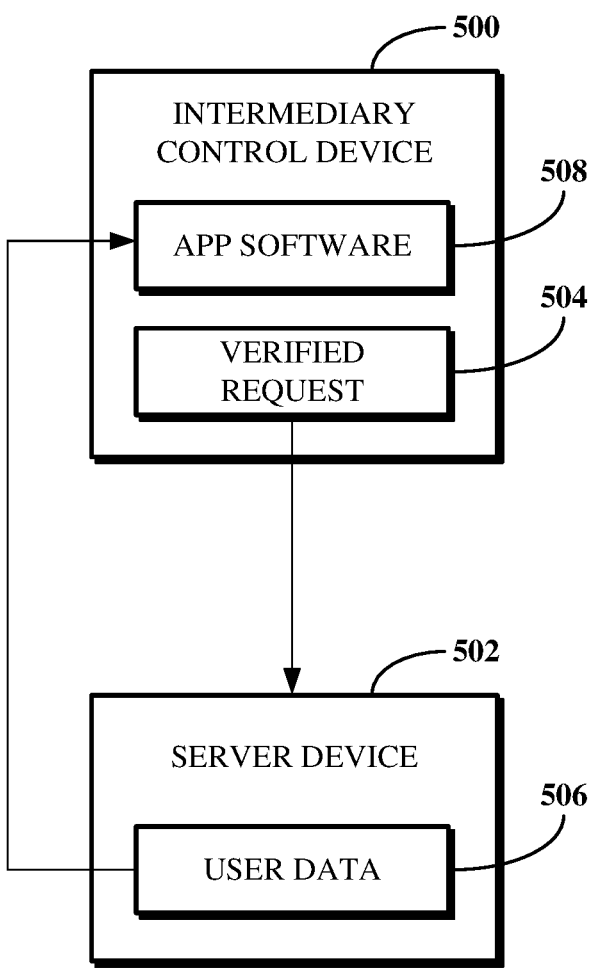
FIG. 5 is a block diagram of an example of communications between an intermediary control device and a server device.

FIG. 5 is a block diagram of an example of communications between an intermediary control device 500 and a server device 502, which may, for example, respectively be the intermediary control device 106 and the server device 104 shown in FIG. 1. The intermediary control device 500 has a verified request 504. The verified request 504 refers to a request from a client device (e.g., the client device 108 shown in FIG. 1) that has been allowed, such as based on a response to a signal transmitted using a beacon device (e.g., the beacon device 102 shown in FIG. 1). For example, the verified request 504 can be or include data indicating that the client device is within a range of the intermediary control device 500.

The intermediary control device 500 uses the verified request 504 to transmit a request for user data 506 to the server device 502. For example, the verified request 504 can indicate to allow a transaction to be processed using application software 508 running on the intermediary control device 500. Processing the transaction can include obtaining the user data 506 from the server device 502. For example, the user data 506 may be information associated with a user account of a user of a client device from which the original request was sent. The server device 502 transmits the user data 506 to the intermediary control device 500, such as for use by the application software 508. The application software 508 uses the user data 506 to process the transaction.

Implementations of the communications between the intermediary control device 500 and the server device 502 may differ from what is shown and described with respect to FIG. 5. In some implementations, the application software 508 may receive the user data 506 before the intermediary control device 500 obtains the verified request 504. For example, the application software 508 may receive the user data 506 from the server device 502 by performing user authentication operations unrelated to the request that becomes the verified request 504. In another example, the user data 506 may be locally stored within the intermediary control device 500. In such an implementation, the server device 502 may be omitted.

Figure 6:
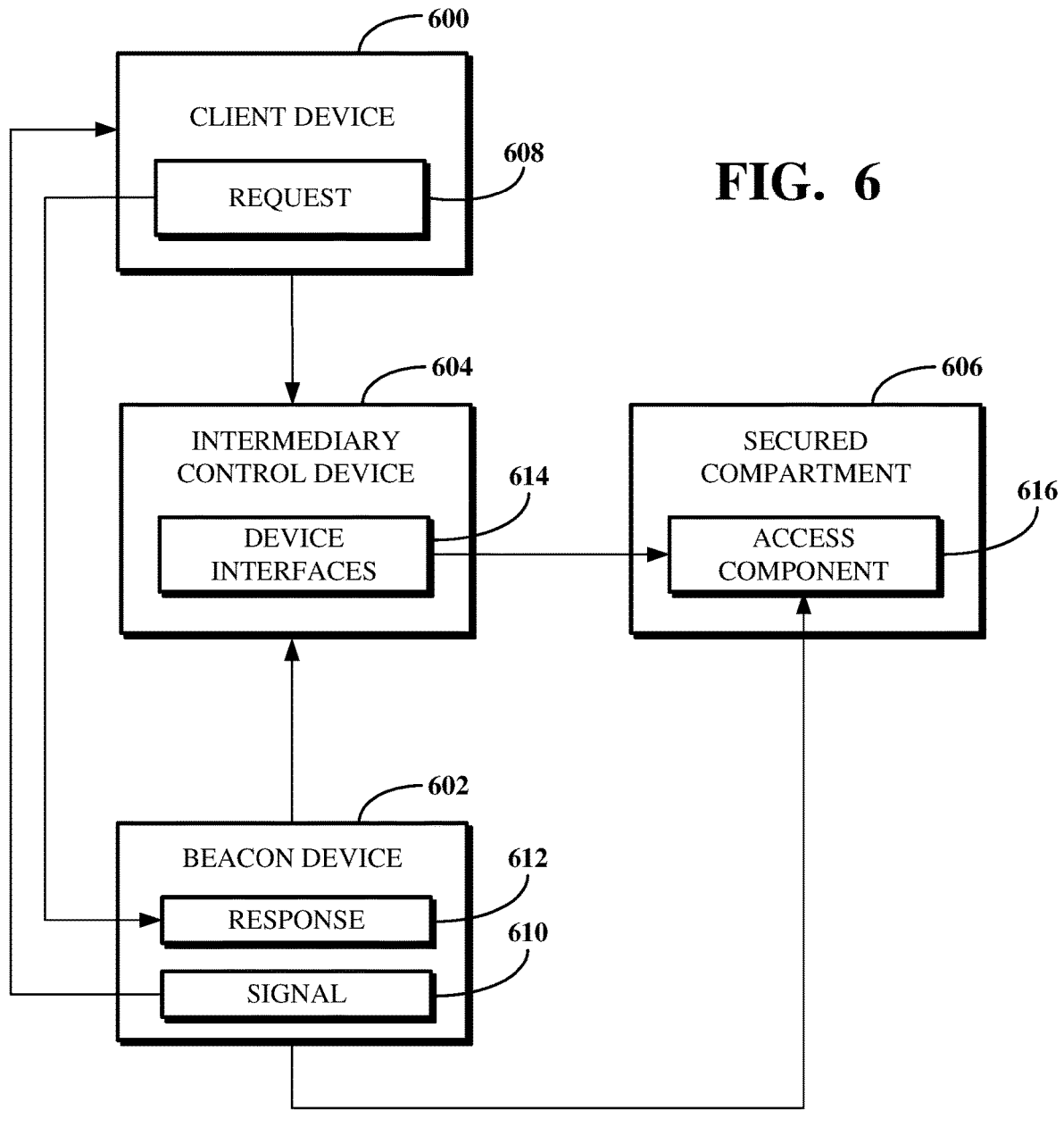
FIG. 6 is a block diagram of an example of communications between a client device, a beacon device, an intermediary control device, and a secured compartment.

FIG. 6 is a block diagram of an example of communications between a client device 600, a beacon device 602, an intermediary control device 604 (e.g., the client device 108, the beacon device 102, and the intermediary control device 106 shown in FIG. 1), and a secured compartment 606. The client device 600 generates a request 608 that is transmitted to the intermediary control device 604. Processing the transaction using the intermediary control device 604 includes processing the request 608 to complete the some or all of the transaction.

The beacon device 602 transmit a signal 610, such as a Bluetooth®, BLE, RF, or other wireless signal that can be received by the client device 600. The beacon device 602 may constantly (e.g., continuously or periodically, such as per a time interval) transmit the signal 610. The signal 610 may be transmitted within a defined proximity of the intermediary control device 604. As such, the transmission of the signal 610 may be received when another device, for example, the client device 600, is located within that defined proximity of the intermediary control device 604. Thus, the client device 600 may generate and transmit a response 612 to the signal 610 upon the client device 600 receiving signal 610, such as by the client device 600 entering the defined proximity (e.g., the range 110 shown in FIG. 1).

In response to the response 612, the beacon device 602 transmits data indicative of the response 612 to the intermediary control device 604, such as to enable the client device 600 to transmit the request 608 to the intermediary control device 604. Alternatively, in response to the response 612, the beacon device 602 may transmit data to the client device 600 to enable the client device 600 to transmit the request 608 to the intermediary control device 604. The intermediary control device 604 uses the data indicative of the response 612 to allow or deny the request 608.

In some cases, the request 608 may include a request for an item stored in the secured compartment 606. In such a case, after verifying the request 608, the intermediary control device 604 uses one or more device interfaces 614 to transmit a command to the secured compartment 606, such as to cause an access component 616 of the secured compartment 606 to be accessible. For example, the access component 616 may include a locking mechanism that, when enabled, prevents access to the secured compartment 606. The command transmitted to the secured compartment 606 may thus include a command to disable the locking mechanism, such as to permit a user of the client device 600 or another person to retrieve the item associated with the request 608.

Implementations of the communications between the client device 600, the beacon device 602, the intermediary control device 604, and the secured compartment 606 may differ from what is shown and described with respect to FIG.

6. In some implementations, the beacon device 602 causes the access to the secured compartment 606 instead of the intermediary control device 604. For example, the beacon device 602 may include processing functionality for determining that the request 608 includes a request for an item stored in the secured compartment 606. The beacon device 602, after receiving the response 612, can thus generate a command to cause the access component 616 to be accessible. The beacon device 602 can then transmit that command to the secured compartment 606, such as to grant access to the secured compartment 606.

In some such implementations, the intermediary control device 604 may receive the request 608 and determine, based on the request 608, that the request 608 includes a request for the item stored in the secured compartment 606. The intermediary control device 604 may then cause the beacon device 602 to generate and transmit the command to grant the access to the secured compartment 606.

In some implementations, the signal 610 may be transmitted from the beacon device 602 responsive to the request 608. For example, the intermediary control device 604 may receive the request 608 from the client device 600 before the signal 610 is transmitted by the beacon device 602. After receiving the request 608, the intermediary control device 604 then transmit a command to the beacon device 602 to cause the beacon device 602 to transmit the signal 610. Upon receipt of the signal 610 by the client device 600 or shortly thereafter, the client device 600 generates the response 612.

In some such implementations, the beacon device 602 receives the response 612 and then transmits data indicating that the response 612 was received to the intermediary control device 604. In other such implementations, the intermediary control device 604 receives the response 612 from the client device 600. After the intermediary control device 604 receives the response 612 or data indicating that the response 612 was received (e.g., by the beacon device 602), the intermediary control device 604 processes the request 608.

In some implementations, processing the request 608 can include verifying that the request 608 is to be processed using the intermediary control device 604. For example, the intermediary control device 604 may be one of a number of intermediary control devices within a physical area. The beacon device 602 can include within the signal 610 an identifier of the intermediary control device 604 and/or of the beacon device 602 itself, such as to identify the particular intermediary control device to use for processing the request 608. The response 612 further indicates the identifier from the signal 610.

Figure 7:
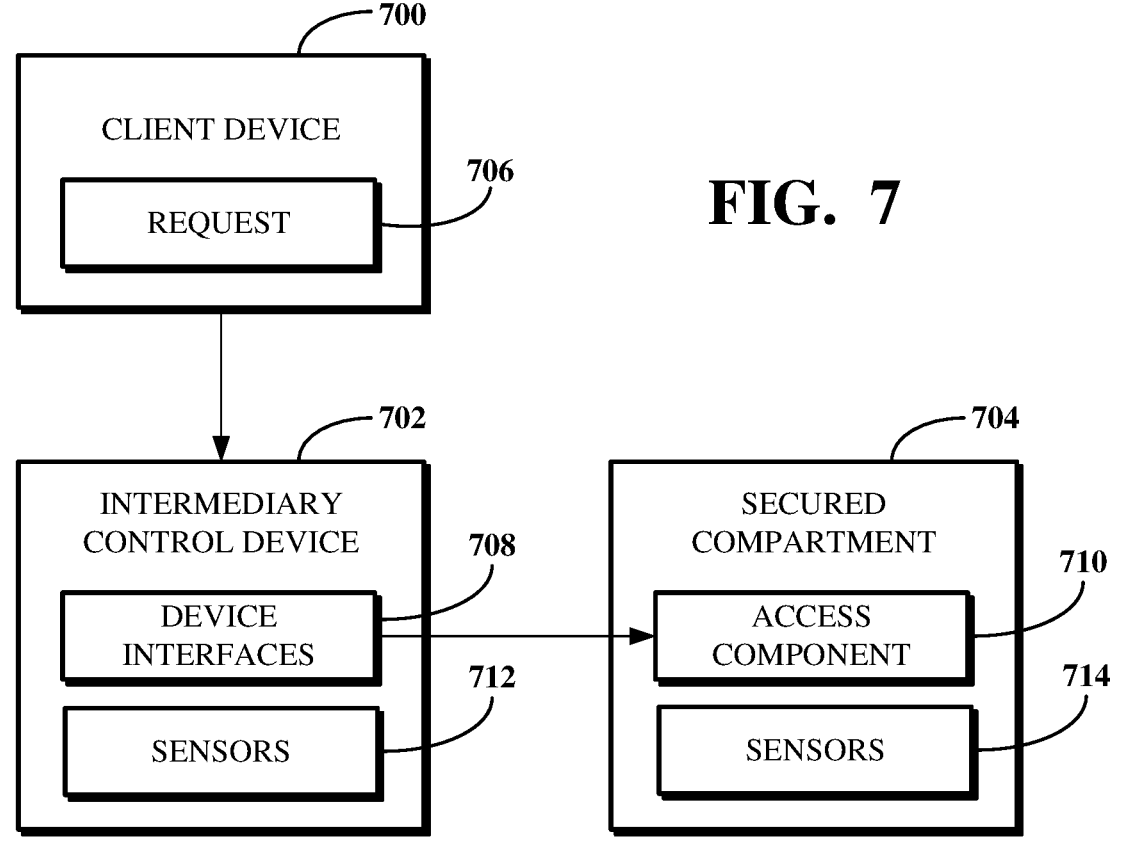
FIG. 7 is a block diagram of an example of communications between a client device, an intermediary control device, and a secured compartment.

FIG. 7 is a block diagram of an example of communications between a client device 700 (e.g., the client device 108 shown in FIG. 1), an intermediary control device 702 (e.g., the intermediary control device 106 shown in FIG. 1), and a secured compartment 704. The client device 700 generates a request 706 that is transmitted to the intermediary control device 702. Processing the transaction using the intermediary control device 702 includes processing the request 706 to complete the some or all of the transaction.

The request 706 may include a request for an item stored in the secured compartment 704. The intermediary control device 702 uses one or more device interfaces 708 to transmit a command to the secured compartment 704, such as to cause an access component 710 of the secured compartment 704 to be accessible. For example, the access component 710 may include a locking mechanism that, when enabled, prevents access to the secured compartment 704. The command transmitted to the secured compartment 704 may thus include a command to disable the locking mechanism, such as to permit a user of the client device 700 or another person to retrieve the item associated with the request 706.

After the access is granted to the secured compartment 704, access monitoring operations are performed by the secured compartment 704 and/or by the intermediary control device 702. For example, the intermediary control device 702 may include one or more sensors 712. Similarly, the secured compartment 704 may include one or more sensors 714. The sensors 712 and/or the sensors 714 may include, for example, cameras that monitor persons and objects within a vicinity of the secured compartment, pressure sensors that monitor whether items within the secured compartment have moved, magnetic or similar sensors that detect when a door or other access element of a secured compartment has been opened, or the like, or a combination thereof.

For example, monitoring the access to the secured compartment 704 may include using a camera of the secured compartment 704 to determine whether a person approaches the secured compartment 704. In another example, monitoring the access to the secured compartment 704 may include using the camera of the secured compartment 704 to verify that an item retrieved from the secured compartment is the item associated with the request 706. In yet another example, monitoring the access to the secured compartment 704 may include using a camera of the secured compartment 704 and/or a camera of the intermediary control device 702 to determine whether a person leaves a vicinity of the secured compartment 704 before retrieving an item from the secured compartment 704.

At a time after the access to the secured compartment 704 is granted, the access is terminated. Terminating the access includes causing the access component 710 of the secured compartment 704 to no longer be accessible. For example, terminating the access can include the locking mechanism or other element of the secured compartment 704 adjusting a setting to electronically enable the lock of the secured compartment 704.

Implementations of the communications between the client device 700, the intermediary control device 702, and the secured compartment 704 may differ from what is shown and described with respect to FIG. 7. In some implementations, a beacon device (e.g., the beacon device 102 shown in FIG. 1) may be used to facilitate some or all of the processing shown. For example, the beacon device may be used to verify a proximity of the client device 700 with respect to the intermediary control device 702, such as before the request 706 is processed to grant access to the secured compartment 704. In another example, the beacon device, rather than the intermediary control device 702, may control the access to the secured compartment 704, such as by transmitting commands to unlock and/or lock the access component 710 of the secured compartment 704.

Figure 8:
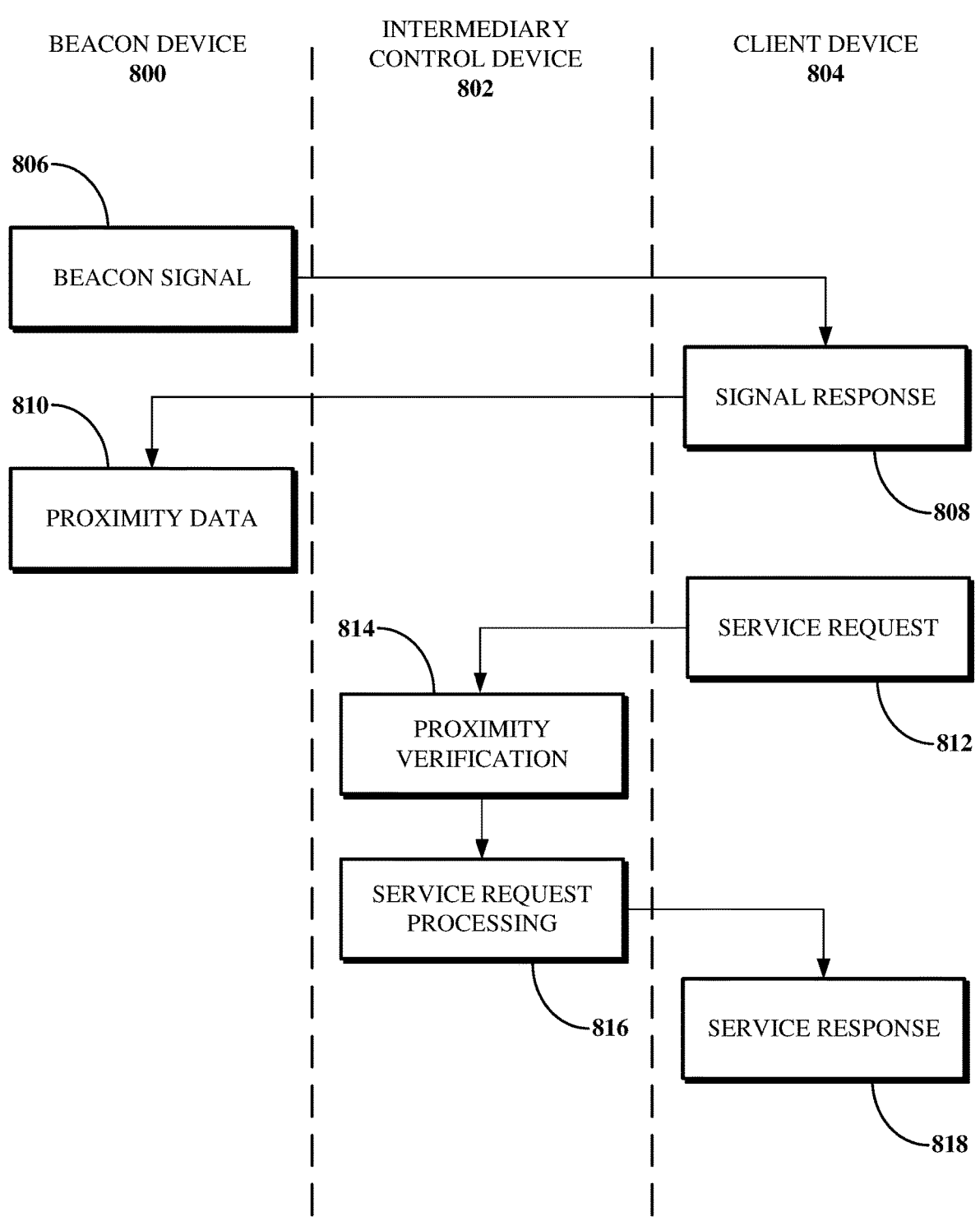
FIG. 8 is an illustration of an example of a data communication sequence between components of a system for request processing based on proximity detection.

FIG. 8 is an illustration of an example of a data communication sequence between components of a system for request processing based on proximity detection. The system for request processing may, for example, be the system 100 shown in FIG. 1. The components performing the data communication sequence include a beacon device 800, an intermediary control device 802, and a client device 804, which may, for example, respectively be the beacon device 102, the intermediary control device 106, and the client device 108 shown in FIG. 1. The data communication sequence includes data communicated in the processing of a request from the client device 804 based on a proximity of the client device 804 to the beacon device 800.

The beacon device 800 constantly (e.g., continuously or periodically, such as per a time interval) transmits a beacon signal 806. The beacon signal 806 may, for example, be a Bluetooth®, BLE, RF, or other wireless signal. At some point after the beacon device 800 transmits the beacon signal 806, the beacon signal 806 is received at the client device 804. Where the client device 804 is within a range of the beacon device 800 to receive the beacon signal 806, the client device 804 then transmits a signal response 808 as a response to the beacon signal 806.

The beacon device 800 generates proximity data 810 based on the signal response 808. The proximity data 810 is data indicative of a proximity of the client device 804 to the intermediary control device 802. The proximity data 810 may indicate a value representing a distance of the client device 804 from the intermediary control device 802 (e.g., based on a known distance between the intermediary control device 802 and the beacon device 800). Alternatively, the proximity data 810 may be a Boolean value indicating whether the client device 804 is or is not in a range of the intermediary control device 802.

For example, where the client device 804 transmits the signal response 808, the beacon device 800 can receive the signal response 808 and use the signal response 808 to generate the proximity data 810. In another example, the beacon device 800 can generate the proximity data 810 after determining an amount of time has elapsed since the transmission of the beacon signal 806 without the beacon device 800 receiving the signal response 808.

After the proximity data 810 is generated, the client device 804 transmits a service request 812 to the intermediary control device 802. The service request 812 is a request associated with application software running on the intermediary control device 802. For example, the service request 812 may be a request to process a transaction for an item available through the application software, a request to authenticate a user account or access thereto with respect to the application software, or another request.

After the intermediary control device 802 receives the service request 812, the intermediary control device 802 performs proximity verification operations 814 against the proximity data 810. For example, the beacon device 800 may transmit the proximity data 810 to the intermediary control device 802 after the intermediary control device 802 receives the service request 812. In another example, the beacon device 800 may transmit the proximity data 810 to the intermediary control device 802 before the intermediary control device 802 receives the service request, such as in response to the generation of the proximity data 810.

The proximity verification operations 814 include one or more operations performed to verify the proximity of the client device 804 to the intermediary control device 802 using the proximity data 810. In the event the proximity verification operations 814 determine that the proximity data 810 reflects that the client device 804 is within a range of the intermediary control device 802, the proximity verification operations 814 verify the proximity data 810. Otherwise, the proximity verification operations 814 determine that the proximity data 810 is not verified.

The output of the proximity verification operations 814 (e.g., an indication as to whether the proximity data 810 is verified) is then used by the intermediary control device 802 to perform service request processing operations 816. The service request processing operations 816 include one or more operations performed to allow or deny the service request 812 earlier received from the client device 804 based on the output of the proximity verification operations 814. For example, the service request processing operations 816 can determine to allow the service request 812 when the output of the proximity verification operations 814 indicates that the client device 804 is within a range of the intermediary control device 802 (e.g., the range 110 shown in FIG. 1). In another example, the service request processing operations 816 can determine to deny the service request 812 when the output of the proximity verification operations 814 indicates that the client device 804 is not within the range of the intermediary control device 802.

The client device 804 then receives a service response 818 from the intermediary control device 802. The service response 818 is a response to the service request 812. The service response 818 indicates whether the service request 812 is allowed or denied. The service response 818 may also indicate or include other information. For example, where the service request 812 is a request for a transaction for an item associated with the intermediary control device 802, the service response 818 can include information about the item. In another example, the service response 818 can indicate that a user account has been modified, such as by a deduction in a number of credits available to the user of the user account based on a recently completed transaction.

Implementations of the data communication sequence may differ from what is shown and described with respect to FIG. 8. In some implementations, the service request 812 may be produced at the intermediary control device 802. For example, a user of the client device 804 may cause the intermediary control device 802 to produce the service request 812, such as by using application software running at the intermediary control device 802 to initiate or request a transaction or otherwise initiate a service process for which request processing is performed.

In such an implementation, the client device 804 does not transmit the service request 812 to the intermediary control device 802. Further, in such an implementation, the intermediary control device 802 may not transmit the service response 818 to the client device 804. For example, the intermediary control device 802 may instead indicate the service response 818 (e.g., by outputting information indicative of the service response 818 for display).

In some implementations, the proximity verification operations 814 can include operations performed to determine whether the proximity of the client device to the intermediary control device 802 satisfies a distance threshold. For example, the distance threshold can represent a maximum distance that the client device 904 can be away from the intermediary control device 802 to remain in the range of the intermediary control device 802. The distance threshold may, for example, be defined based on a size of the range. As such, the distance threshold is satisfied when the proximity data 810 indicates that the client device 804 is less than or equal to that maximum distance away from the intermediary control device 802. In such an implementation, the proximity verification operations 814 verify the proximity data 810 responsive to a determination that the distance threshold is satisfied.

Figure 9:
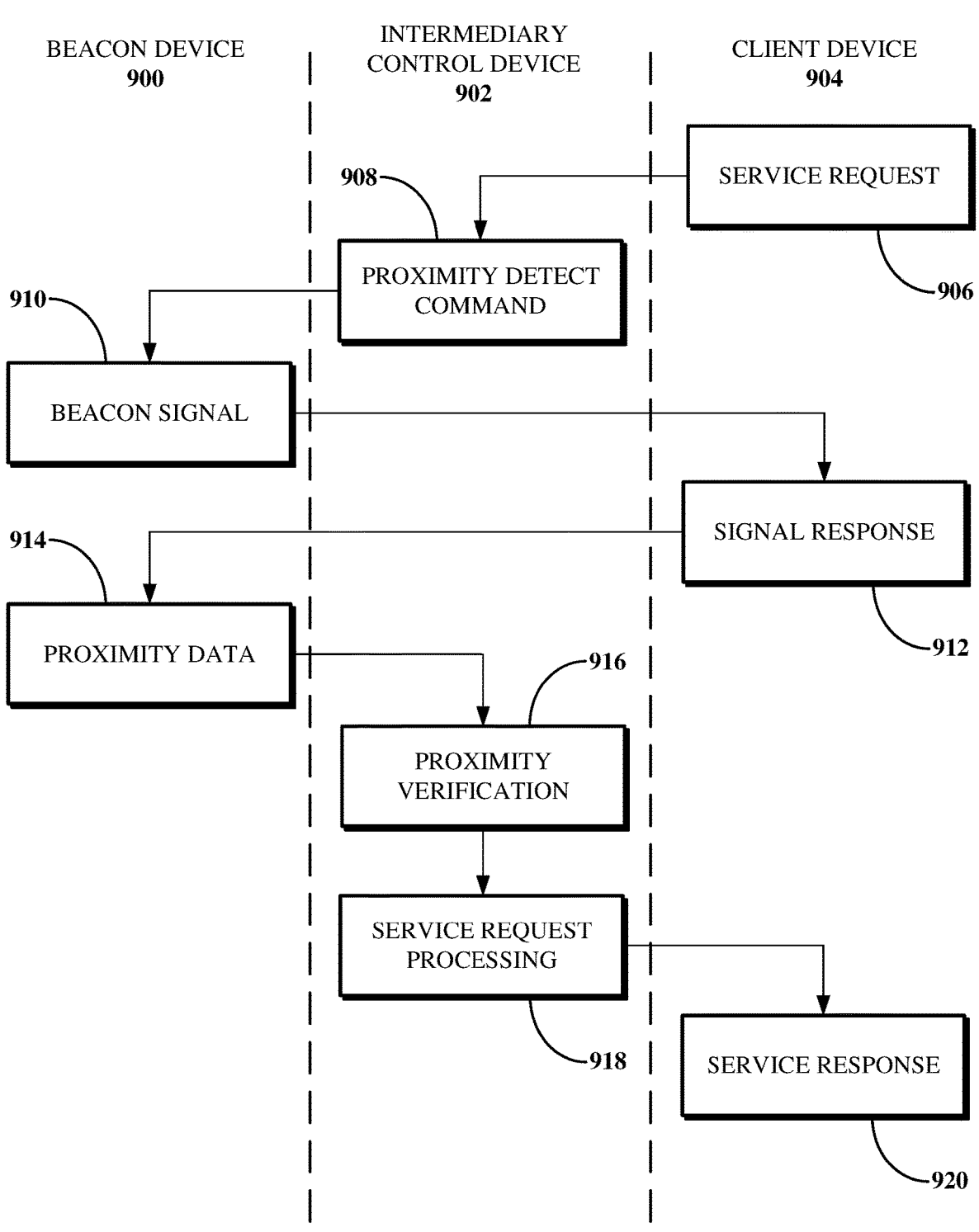
FIG. 9 is an illustration of an example of a data communication sequence between components of a system for request processing based on proximity detection responsive to the request.

FIG. 9 is an illustration of an example of a data communication sequence between components of a system for request processing based on proximity detection responsive to the request. The system for request processing may, for example, be the system 100 shown in FIG. 1. The components performing the data communication sequence include a beacon device 900, an intermediary control device 902, and a client device 904, which may, for example, respectively be the beacon device 102, the intermediary control device 106, and the client device 108 shown in FIG. 1. The data communication sequence includes data communicated in the processing of a request from the client device 904 based on a proximity of the client device 904 to the beacon device 900.

The client device 904 transmits a service request 906 to the intermediary control device 902. The service request 906 is a request associated with application software running on the intermediary control device 902. For example, the service request 906 may be a request to process a transaction for an item available through the application software, a request to authenticate a user account or access thereto with respect to the application software, or another request. After the intermediary control device 902 receives the service request 906, the intermediary control device 902 generates a proximity detection command 908 and transmits the proximity detection command 908 to the beacon device 900.

Upon the beacon device 900 receiving the proximity detection command 908, the beacon device 900 transmits a beacon signal 910. The beacon signal 910 may, for example, be a Bluetooth®, BLE, RF, or other wireless signal. The proximity detection command 908 thus includes instructions used to cause the beacon signal 910 to transmit the beacon signal 910. After the beacon device 900 transmits the beacon signal 910, the beacon signal 910 is received at the client device 904. Where the client device 904 is within a range of the beacon device 900 to receive the beacon signal 910, the client device 904 then transmits a signal response 912 as a response to the beacon signal 910.

The beacon device 900 generates proximity data 914 based on the signal response 912. The proximity data 914 is data indicative of a proximity of the client device 904 to the intermediary control device 902. The proximity data 914 may indicate a value representing a distance of the client device 904 from the intermediary control device 902 (e.g., based on a known distance between the intermediary control device 902 and the beacon device 900). Alternatively, the proximity data 914 may be a Boolean value indicating whether the client device 904 is or is not in a range of the intermediary control device 902.

For example, where the client device 904 transmits the signal response 912, the beacon device 900 can receive the signal response 912 and use the signal response 912 to generate the proximity data 914. In another example, the beacon device 900 can generate the proximity data 914 after determining an amount of time has elapsed since the transmission of the beacon signal 910 without the beacon device 900 receiving the signal response 912.

The intermediary control device 902 receives the proximity data 914 and performs proximity verification operations 916 against the proximity data 914. The proximity verification operations 916 include one or more operations performed to verify the proximity of the client device 904 to the intermediary control device 902 using the proximity data 914. In the event the proximity verification operations 916 determine that the proximity data 914 reflects that the signal response 912 is received at the beacon device 900, the proximity verification operations 916 verify the proximity data 914. Otherwise, the proximity verification operations 916 determine that the proximity data 914 is not verified.

The output of the proximity verification operations 916 (e.g., an indication as to whether the proximity data 914 is verified) is then used by the intermediary control device 902 to perform service request processing operations 918. The service request processing operations 918 include one or more operations performed to allow or deny the service request 906 earlier received from the client device 904 based on the output of the proximity verification operations 916. For example, the service request processing operations 918 can determine to allow the service request 906 when the output of the proximity verification operations 916 indicates that the client device 904 is within a range of the intermediary control device 902 (e.g., the range 110 shown in FIG. 1). In another example, the service request processing operations 918 can determine to deny the service request 906 when the output of the proximity verification operations 916 indicates that the client device 904 is not within the range of the intermediary control device 902.

The client device 904 then receives a service response 920 from the intermediary control device 902. The service response 920 is a response to the service request 906. The service response 920 indicates whether the service request 906 is allowed or denied. The service response 920 may also indicate or include other information. For example, where the service request 906 is a request for a transaction for an item associated with the intermediary control device 902, the service response 920 can include information about the item. In another example, the service response 920 can indicate that a user account has been modified, such as by a deduction in a number of credits available to the user of the user account based on a recently completed transaction.

Implementations of the data communication sequence may differ from what is shown and described with respect to FIG. 9. In some implementations, the service request 906 may be produced at the intermediary control device 902. For example, a user of the client device 904 may cause the intermediary control device 902 to produce the service request 906, such as by using application software running at the intermediary control device 902 to initiate or request a transaction or otherwise initiate a service process for which request processing is performed.

In such an implementation, the client device 904 does not transmit the service request 906 to the intermediary control device 902. Further, in such an implementation, the intermediary control device 902 may not transmit the service response 920 to the client device 904. For example, the intermediary control device 902 may instead indicate the service response 920 (e.g., by outputting information indicative of the service response 920 for display).

In some implementations, the proximity verification operations 916 can include operations performed to determine whether the proximity of the client device to the intermediary control device 902 satisfies a distance threshold. For example, the distance threshold can represent a maximum distance that the client device 904 can be away from the intermediary control device 902 to remain in the range of the intermediary control device 902. The distance threshold may, for example, be defined based on a size of the range. As such, the distance threshold is satisfied when the proximity data 914 indicates that the client device 904 is less than or equal to that maximum distance away from the intermediary control device 902. In such an implementation, the proximity verification operations 916 verifies the proximity data 914 responsive to a determination that the threshold is satisfied.

Figure 10:
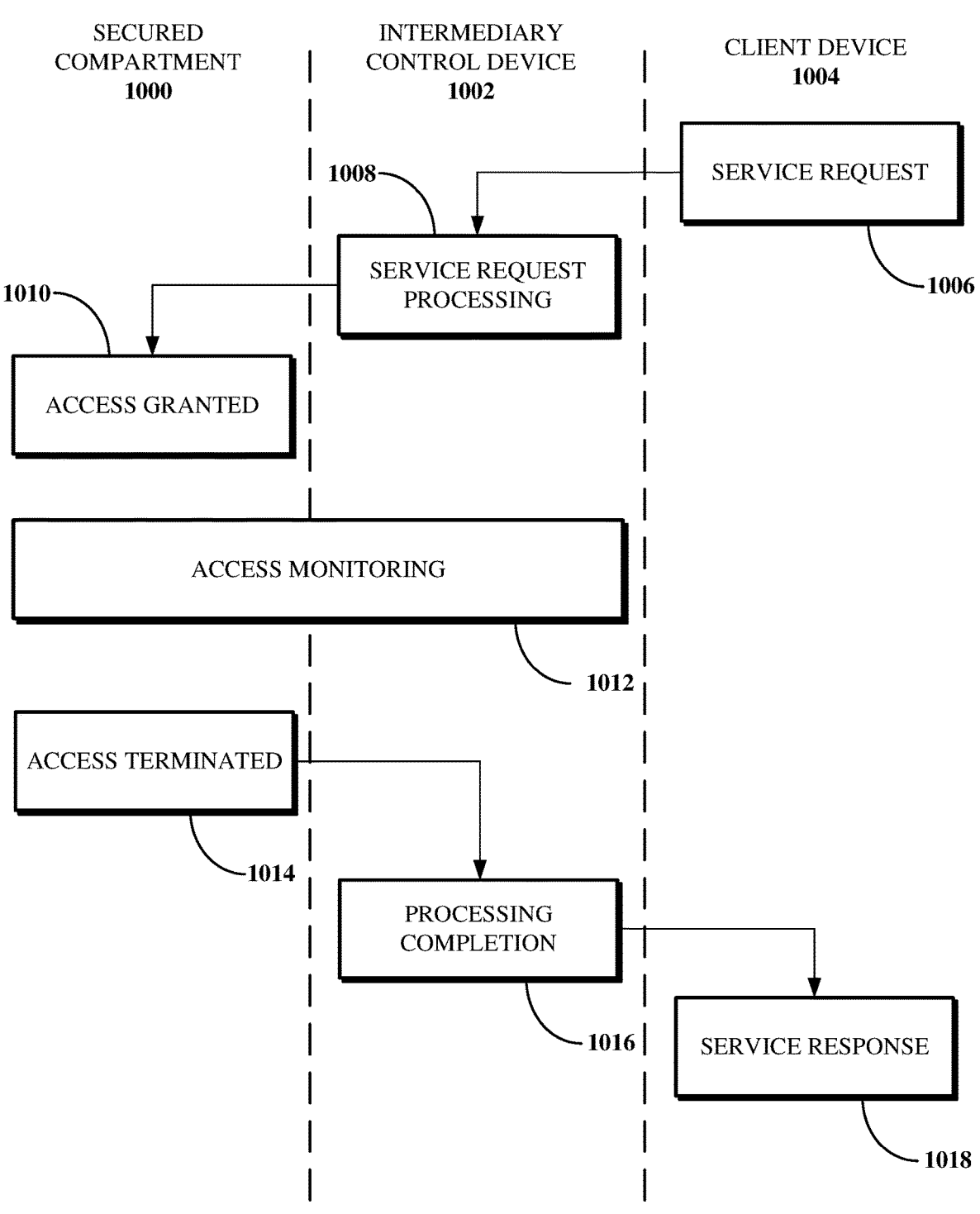
FIG. 10 is an illustration of an example of a data communication sequence between components of a system for request processing including secured access.

FIG. 10 is an illustration of an example of a data communication sequence between components of a system for request processing including secured access. The system for request processing may, for example, be the system 100 shown in FIG. 1. The components performing the data communication sequence include a secured compartment 1000, an intermediary control device 1002 (e.g., the intermediary control device 106 shown in FIG. 1), and a client device 1004 (e.g., the client device 108 shown in FIG. 1).

The client device 1004 transmits a service request 1006 to the intermediary control device 1002. The service request 1006 is a request associated with application software running on the intermediary control device 1002. For example, the service request 1006 may be a request to process a transaction for an item stored within the secured compartment 1000 and available through the application software.

After the intermediary control device 1002 receives the service request 1006, the intermediary control device 1002 performs service request processing operations 1008. The service request processing operations 1008 include one or more operations performed to process the service request 1006. For example, the service request processing operations 1008 may process the service request 1006 by identifying the item requested in connection with the service request 1006. The service request processing operations 1008 may further process the service request 1006 by determining that the item is located within the secured compartment 1000.

In response to identifying the item and/or the secured compartment 1000, the service request processing operations 1008 grant access to the secured compartment 1000. For example, granting access to the secured compartment may include the application software (e.g., as part of the service processing operations 1008 or otherwise) generating a command to cause the secured compartment 1000 to become unlocked.

Access is granted 1010 to the secured compartment 1000 in response to the command received and processed at the secured compartment 1000. For example, processing the command at the secured compartment 1000 may include a locking mechanism or other element of the secured compartment 1000 adjusting a setting to electronically disable a lock of the secured compartment 1000. The lock may be a mechanical lock, an electrical lock, or an electromechanical lock.

After the access is granted 1010 to the secured compartment 1000, access monitoring operations are performed by the secured compartment 1000 and/or by the intermediary control device 1002. For example, the intermediary control device 1002 and/or the secured compartment 1000 may include one or more sensors. The sensors may include, for example, cameras that monitor persons and objects within a vicinity of the secured compartment, pressure sensors that monitor whether items within the secured compartment have moved, magnetic or similar sensors that detect when a door or other access element of a secured compartment has been opened, or the like, or a combination thereof.

For example, monitoring the access to the secured compartment 1000 may include using a camera of the secured compartment 1000 to determine whether a person approaches the secured compartment 1000. In another example, monitoring the access to the secured compartment 1000 may include using the camera of the secured compartment 1000 to verify that an item retrieved from the secured compartment is the item associated with the service request 1006. In yet another example, monitoring the access to the secured compartment 1000 may include using a camera of the secured compartment 1000 and/or a camera of the intermediary control device 1002 to determine whether a person leaves a vicinity of the secured compartment 1000 before retrieving an item from the secured compartment 1000.

At a time after the access is granted 1010, the access is terminated 1014. Terminating the access includes causing the secured compartment 1000 to no longer be accessible. For example, terminating the access 1014 can include the locking mechanism or other element of the secured compartment 1000 adjusting a setting to electronically enable the lock of the secured compartment 1000. The access may be terminated based on a determination that the item associated with the service request 1006 has been retrieved from the secured compartment 1000.

Alternatively, the access may be terminated based on a determination that a threshold amount of time has elapsed since the access was granted. For example, the threshold amount of time may be defined at the secured compartment. In another example, the threshold amount of time may be defined within the command transmitted from the intermediary control device 1002.

As a further alternative, the access may be terminated based on a determination that a user of the client device 1004 is no longer within a range of the intermediary control device 1002 and/or of the secured compartment 1000 (e.g., the range 110 shown in FIG. 1). For example, one or more sensors (e.g., cameras) of the intermediary control device 1002 and/or one or more sensors (e.g., cameras) of the secured compartment 1000 may be used to determine that the user of the client device 1004 is no longer within the range of the intermediary control device 1002 and/or of the secured compartment 1000. For example, image processing or like software can estimate the range from a location of one or both of the intermediary control device 1002 or the secured compartment 1000. The access may be terminated if the user of the client device 1004 is not detected within the range.

After the access is terminated 1014, the intermediary control device 1002 performs processing completion operations 1016. The processing completion operations 1016 may include processing data indicating whether the item associated with the service request 1006 was retrieved from the secured compartment 1000. For example, if a determination is made that the item was retrieved from the secured compartment 1000, the processing completion operations 1016 can generate data indicating that the service request 1006 is successfully completed. In another example, if the determination is made that the item was retrieved from the secured compartment 1000, the processing completion operations 1016 can update an inventory associated with the intermediary control device 1002, such as to reflect that the retrieved item is no longer included in the inventory. The inventory may, for example, correspond to a database associated with the application software running at the intermediary control device 1002.

The client device 1004 then receives a service response 1018 from the intermediary control device 1002. The service response 1018 is a response to the service request 1006. The service response 1018 indicates whether the service request 1006 is successfully completed. For example, the service response 1018 may be or include data generated using the processing completion operations 1016.

Implementations of the data communication sequence may differ from what is shown and described with respect to FIG. 10. In some implementations, the access monitoring operations 1012 may be omitted. For example, a message can be communicated to a user of the client device 1004 (e.g., at the client device 1004 and/or the intermediary control device 1002) to notify the user of the client device 1004 that he or she has a certain amount of time to retrieve the item associated with the service request 1006 from the secured compartment 1000 before the access to the secured compartment 1000 is terminated.

In some implementations, the intermediary control device 1002 may not transmit the service response 1018 to the client device 1004. For example, the intermediary control device 1002 may instead output (e.g., to a display of the intermediary control device 1002) a message indicating that the processing of the service request 1006 has completed. In another example, instead of transmitting the service response 1018 to the client device 1004, application software running at the intermediary control device 1002 may transmit a message indicating the completion of a transaction associated with the service request 1006, such as to client software running at the client device 1004.

In some implementations, the service request 1006 may be produced at the intermediary control device 1002. For example, a user of the client device 1004 may cause the intermediary control device 1002 to produce the service request 1006, such as by using application software running at the intermediary control device 1002 to initiate or request a transaction or otherwise initiate a service process for which request processing is performed. In such an implementation, the client device 1004 does not transmit the service request 1006 to the intermediary control device 1002.

In some implementations, a beacon device (e.g., the beacon device 102 shown in FIG. 1) causes the access to the secured compartment 1000 instead of the intermediary control device 1002. For example, the beacon device may include processing functionality for determining that the service request 1006 includes a request for an item stored in the secured compartment 1000. The beacon device, after receiving the service request 1006, can thus generate a command to grant the access 1010. The beacon device can then transmit that command to the secured compartment 1000, such as to grant the access to the secured compartment 1000.

In some such implementations, the intermediary control device 1002 may receive the service request 1006 and determine, based on the service request 1006, that the request 1006 includes a request for the item stored in the secured compartment 1000. The intermediary control device 1002 may then cause the beacon device to generate and transmit the command to grant the access 1010 to the secured compartment 1000.

Figure 11:
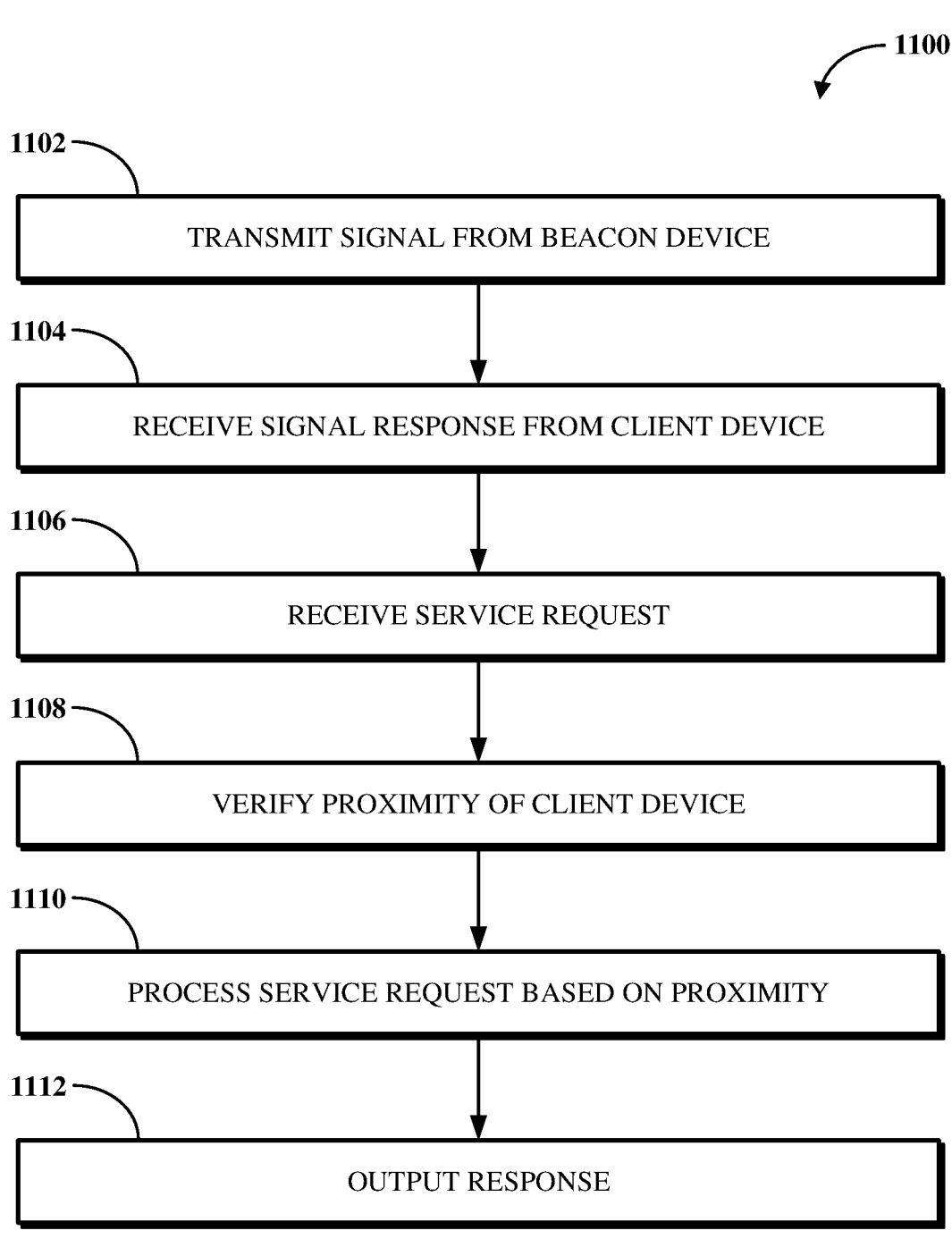
FIG. 11 is a flowchart illustrating an example of a technique for controlling a processing of a request based on proximity detection.
Figure 12:
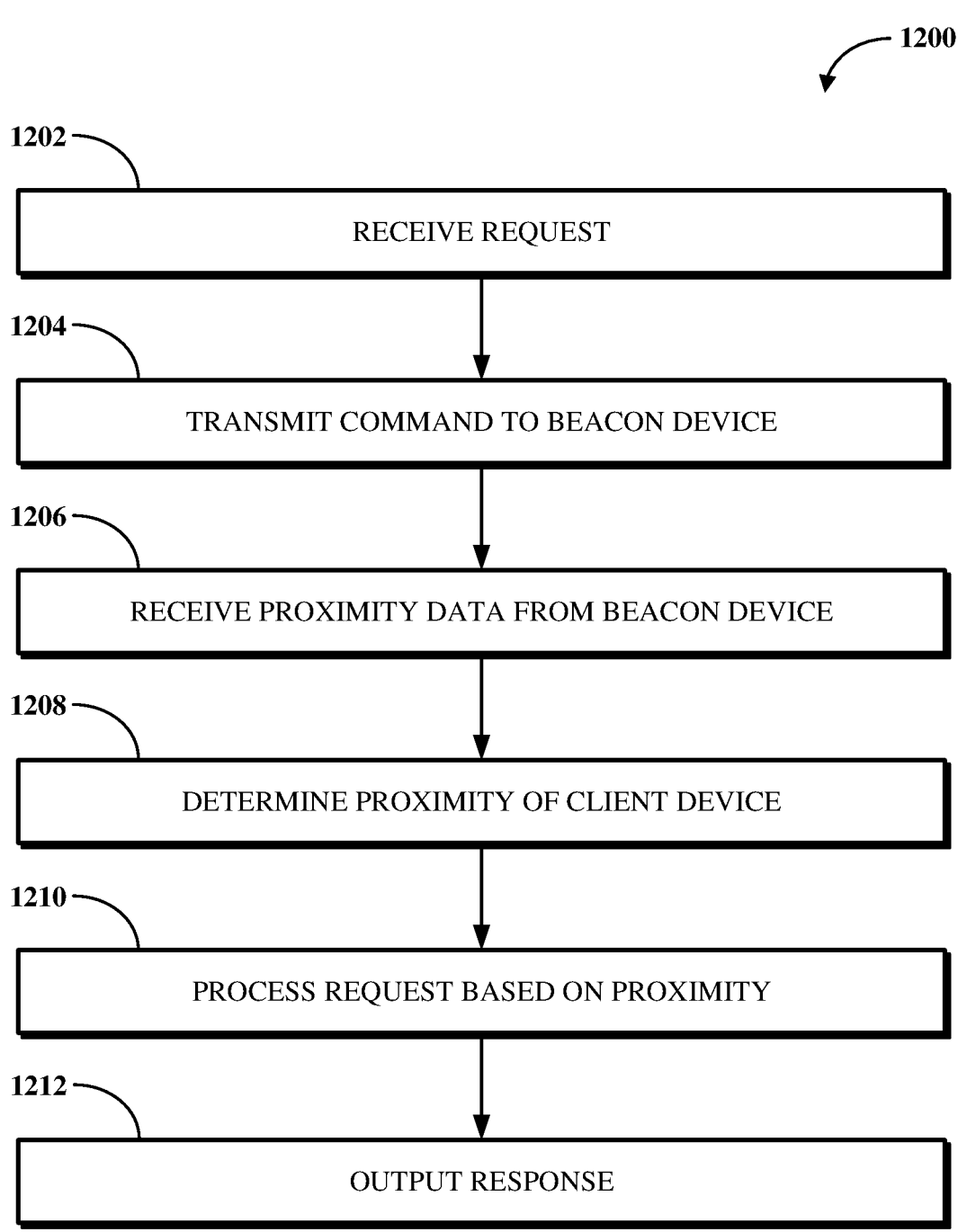
FIG. 12 is a flowchart illustrating an example of a technique for controlling a processing of a request by transmitting a signal from a beacon device response to the request.
Figure 13:
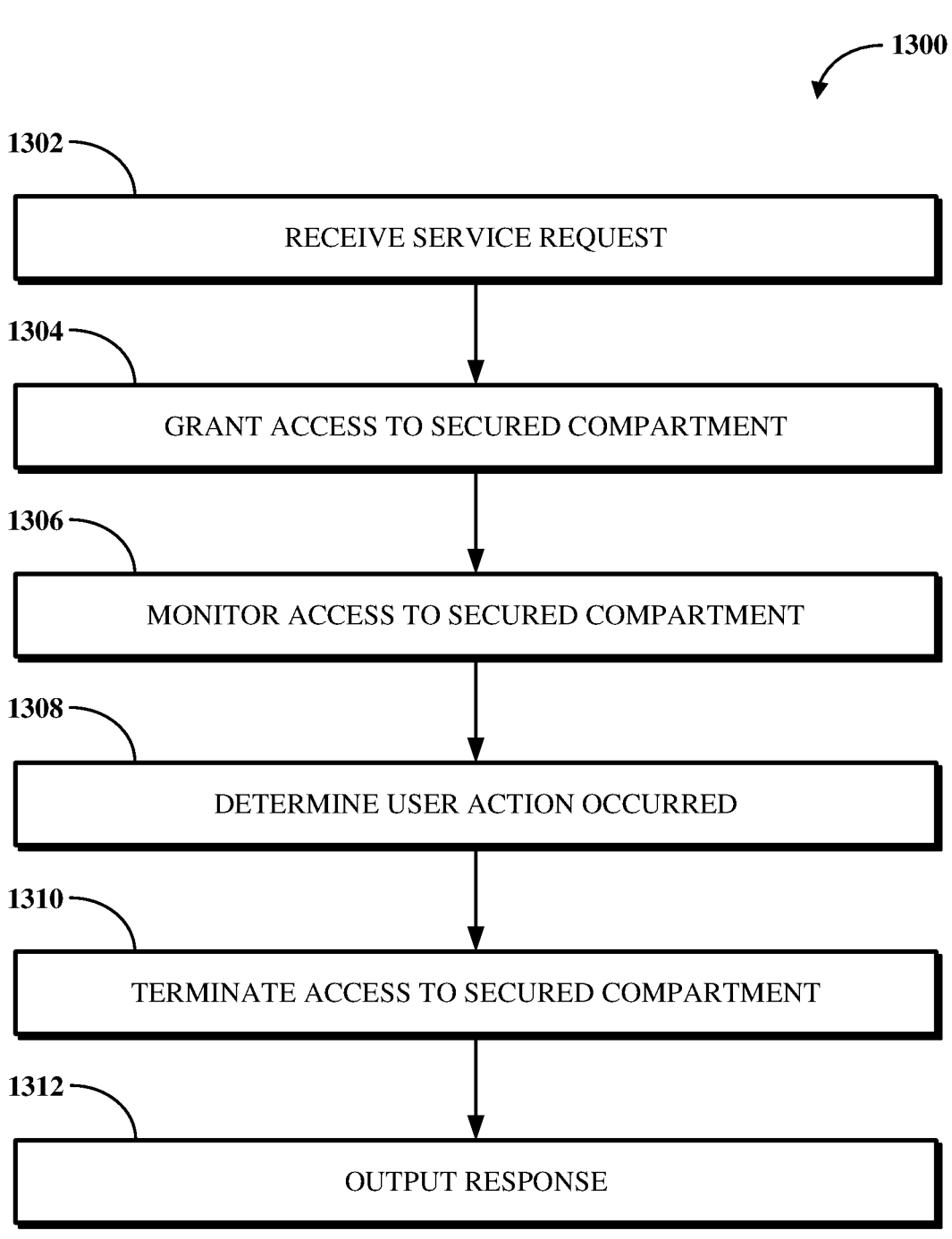
FIG. 13 is a flowchart illustrating an example of a technique for controlling a processing of a request including accessing a secured compartment.

To further describe some implementations in greater detail, reference is next made to examples of techniques used by a system for request processing based on proximity detection. FIG. 11 is a flowchart illustrating an example of a technique 1100 for controlling a processing of a request based on proximity detection. FIG. 12 is a flowchart illustrating an example of a technique 1200 for controlling a processing of a request by transmitting a signal from a beacon device response to the request. FIG. 13 is a flowchart illustrating an example of a technique 1300 for controlling a processing of a request including accessing a secured compartment.

The technique 1100, the technique 1200, and/or the technique 1300 can be executed using computing devices, such as included within or otherwise using the systems, software, and devices described with respect to FIGS. 1-10. The technique 1100, the technique 1200, and/or the technique 1300 can be performed, for example, by executing a machine-readable program or other computer-executable instructions, such as routines, instructions, or programs described according to Java, JavaScript, C++, or other such routines or instructions. The steps, or operations, of the technique 1100, the technique 1200, and/or the technique 1300 or any other technique, method, process, or algorithm described in connection with the implementations disclosed herein can be implemented directly in hardware, firmware, software executed by hardware, circuitry, or a combination thereof.

Although the technique 1100, the technique 1200, and the technique 1300 are each shown as a series of operations for clarity, implementations of those techniques or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

Referring first to FIG. 11, a flowchart illustrating an example of the technique 1100 for controlling a processing of a request based on proximity detection is shown. At 1102, a signal is transmitted from a beacon device. The signal is a Bluetooth®, BLE, RF, or other wireless signal that can be received by a client device (e.g., the client device 108 shown in FIG. 1). The beacon device may constantly (e.g., continuously or periodically, such as per a time interval) transmit the signal. The signal is used to detect a proximity of a device that receives it with respect to an intermediary control device. The signal may be transmitted within a defined proximity of the intermediary control device. As such, the transmission of the signal may be received when another device, for example, the client device, is located within that defined proximity of the intermediary control device.

At 1104, a response to the signal is received. The response may be generated at and received from the client device. The response may be received by the beacon device. Alternatively, the response may be received by the intermediary control device (e.g., where the beacon device is internal to the intermediary control device or the beacon device is omitted). The response can be used to generate proximity data indicating the proximity of the client device to the intermediary control device.

At 1106, a request for a service associated with application software running at the intermediary control device. The request may be received from the client device. In such a case, receiving the request can include the intermediary control device receiving the request over a wireless communication channel available to the intermediary control device, such as using a network interface of the intermediary control device. Alternatively, the request may be produced at the intermediary control device. In such a case, receiving the request can include a first function, module, or other software mechanism of the application software running on the intermediary control device making the request available to a second function, module, or other software mechanism of the application software.

At 1108, responsive to receiving the request, a proximity of the client device with respect to the intermediary control device is verified. Verifying the proximity of the client device with respect to the intermediary control device includes using the proximity data to determine whether the client device is within a range of the intermediary control device (e.g., the range 110 shown in FIG. 1). In the event the proximity data reflects that the client device is within the range of the intermediary control device, the proximity of the client device is verified. Otherwise, the proximity of the client device is not verified. In the event the proximity of the client device is not verified, the application software may suspend or terminate the request.

At 1110, responsive to verifying the proximity of the client device with respect to the intermediary control device, the intermediary control device processes the request earlier received based on that proximity. For example, the application software running at the intermediary control device can determine to allow the request based on the verified proximity data. In another example, the application software running at the intermediary control device can determine to deny the request based on the unverified proximity data.

At 1112, a response to the request is output. The response indicates whether the request is allowed or denied. For example, the response may include a message indicating that the request has been allowed or denied. In another example, the response may include a message indicating that the request processing has completed. In yet another example, the response may include further processing of the request.

In some implementations, the proximity data may reflect a value range for the proximity of the client device to the intermediary control device. For example, the beacon device may generate the proximity data to reflect whether the response to the signal is weak or strong. Where the response is weak, the proximity data can reflect that the client device is relatively far from the intermediary control device. Where the response is strong, the proximity data can reflect that the client device is relatively close to the intermediary control device. In such an implementation, particular values may optionally be configured for each of the ranges. As such, the proximity data may reflect an estimated distance between the client device and the intermediary control device.

In some implementations, processing the request may include granting access to a secured compartment associated with the intermediary control device. For example, where the request is for an item stored in the secured compartment, after verifying the proximity of the client device with respect to the intermediary control device, the application software can transmit a command to the secured compartment to cause a locking mechanism of the secured compartment to unlock. Later, the locking mechanism can be re-locked, such as to terminate the access to the secured compartment.

For example, the locking mechanism can be re-locked after a determination is made that the item is retrieved from the secured compartment (e.g., using one or more sensors). In another example, the locking mechanism can be re-locked after a period of time for retrieving the item has elapsed. In yet another example, the locking mechanism can be re-locked responsive to a determination that the client device or a user of the client device is no longer within the range of the intermediary control device or a range of the secured compartment.

Referring next to FIG. 12, a flowchart illustrating an example of the technique 1200 for controlling a processing of a request by transmitting a signal from a beacon device response to the request is shown. At 1202, a request is received. The request is a request for a service associated with functionality of application software running at an intermediary control device. The request may be received from a client device. In such a case, receiving the request can include the intermediary control device receiving the request over a wireless communication channel available to the intermediary control device, such as using a network interface of the intermediary control device. Alternatively, the request may be produced at the intermediary control device. In such a case, receiving the request can include a first function, module, or other software mechanism of the application software running on the intermediary control device making the request available to a second function, module, or other software mechanism of the application software.

At 1204, a command is transmitted to a beacon device. The beacon device is a device external to the intermediary control device. For example, the beacon device may be a physical device having dedicated wireless communication functionality, such as using Bluetooth®, BLE, RFID, or another wireless communications approach. Alternatively, the beacon device may be internal to the intermediary control device. For example, the beacon device may represent a wireless communications component of the intermediary control device. In another example, the beacon device may be a peripheral coupled to a port (e.g., a USB port) of the intermediary control device or otherwise physically coupled to the intermediary control device.

The command transmitted to the beacon device includes instructions for causing the beacon device to transmit a signal. The instructions of the command may include instructions that, when processed at the beacon device, cause the beacon device to generate a signal. Alternatively, the instructions of the command may include instructions that, when processed at the beacon device, cause the beacon device to transmit a previously generated signal. For example, the beacon device may include a setting for transmitting the signal, which setting may be selectively enabled or disabled. When the setting is disabled, the beacon device does not transmit the signal. When the setting is enabled, the beacon device transmits the signal. The instructions of the command may thus include instructions to selectively enable the setting.

At 1206, proximity data is received from the beacon device. The proximity data includes or otherwise reflects data generated based on a response to the signal transmitted from the beacon device. For example, after the beacon device transmits the signal, the beacon device may receive a response to the signal, such as from the client device. The response indicates that the signal transmitted from the beacon device was received at the client device. The proximity data thus reflects whether such a response was received at the beacon device. For example, in the event no such response was received, the proximity data may reflect that the client device is not proximate to the intermediary control device. However, if such a response is received, the proximity data reflects that the client device is proximity to the intermediary control device. The proximity data may be a Boolean value or another data element used to indicate whether the response was received at the beacon device.

At 1208, the proximity data is processed to determine a proximity of the client device to the intermediary control device. For example, the application software running at the intermediary control device can perform proximity verification operations against the proximity data to determine whether to verify the proximity data based on whether the proximity data indicates that the response was received. A near proximity of the client device to the intermediary control device is determined where the proximity data is verified. In another example, the proximity verification operations can be performed against the proximity data to determine whether to verify the proximity data based on whether a distance between the client device and the intermediary control device, as indicated in the proximity data, satisfies a threshold.

At 1210, after determining that the proximity data indicates a near proximity of the client device to the intermediary control device, the intermediary control device processes the request earlier received based on that proximity. For example, the application software running at the intermediary control device can determine to allow the request based on the verified proximity data. In another example, the application software the application software running at the intermediary control device can determine to deny the request based on the unverified proximity data.

At 1212, a response to the request is output. The response indicates whether the request is allowed or denied. For example, the response may include a message indicating that the request has been allowed or denied. In another example, the response may include a message indicating that the request processing has completed. In yet another example, the response may include further processing of the request.

In some implementations, the proximity data may reflect a value range for the proximity of the client device to the intermediary control device. For example, the beacon device may generate the proximity data to reflect whether the response to the signal is weak or strong. Where the response is weak, the proximity data can reflect that the client device is relatively far from the intermediary control device. Where the response is strong, the proximity data can reflect that the client device is relatively close to the intermediary control device. In such an implementation, particular values may optionally be configured for each of the ranges. As such, the proximity data may reflect an estimated distance between the client device and the intermediary control device.

In some implementations, processing the request may include granting access to a secured compartment associated with the intermediary control device. For example, where the request is for an item stored in the secured compartment, after verifying the proximity of the client device with respect to the intermediary control device, the application software can transmit a command to the secured compartment to cause a locking mechanism of the secured compartment to unlock. Later, the locking mechanism can be re-locked, such as to terminate the access to the secured compartment.

For example, the locking mechanism can be re-locked after a determination is made that the item is retrieved from the secured compartment (e.g., using one or more sensors). In another example, the locking mechanism can be re-locked after a period of time for retrieving the item has elapsed. In yet another example, the locking mechanism can be re-locked responsive to a determination that the client device or a user of the client device is no longer within the range of the intermediary control device or a range of the secured compartment.

Referring next to FIG. 13, a flowchart illustrating an example of the technique 1300 for controlling a processing of a request including accessing a secured compartment is shown. At 1302, a request is received. The request is a request for a service associated with functionality of application software running at an intermediary control device. The request may be received from a client device. In such a case, receiving the request can include the intermediary control device receiving the request over a wireless communication channel available to the intermediary control device, such as using a network interface of the intermediary control device. Alternatively, the request may be produced at the intermediary control device. In such a case, receiving the request can include a first function, module, or other software mechanism of the application software running on the intermediary control device making the request available to a second function, module, or other software mechanism of the application software.

At 1304, access is granted to a secured compartment. The access is granted in response to the request. For example, after the intermediary control device receives the request, the intermediary control device processes the service request, such as identifying the item requested in connection with the service request and/or determining that the item is located within the secured compartment. In response to identifying the item and/or the secured compartment, the access to the secured compartment may be granted. For example, granting access to the secured compartment may include application software running at the intermediary control device generating a command to cause the secured compartment to become unlocked. Access is granted to the secured compartment in response to the command received and processed at the secured compartment. For example, processing the command at the secured compartment may include a locking mechanism or other element of the secured compartment adjusting a setting to electronically disable a lock of the secured compartment.

At 1306, after the access to the secured compartment is granted, the access is monitored. For example, the intermediary control device and/or the secured compartment may include one or more sensors. The sensors may include, for example, cameras that monitor persons and objects within a vicinity of the secured compartment, pressure sensors that monitor whether items within the secured compartment have moved, magnetic or similar sensors that detect when a door or other access element of a secured compartment has been opened, or the like, or a combination thereof.

At 1308, a determination is made that a user action occurred. The user action represents an action by a user of the client device or another person with respect to the secured compartment. For example, the user action may include the user or other person retrieving the item from the secured compartment. The determination that the user action occurred can be made while the access to the secured compartment is being monitored. For example, monitoring the access to the secured compartment may include using one or more cameras (e.g., of the secured compartment and/or of the intermediary control device) to monitor whether the item is retrieved from the secured compartment, whether a different item is retrieved from the secured compartment, and/or whether no item is retrieved from the secured compartment.

At 1310, the access to the secured compartment is terminated. Terminating the access includes causing the secured compartment to no longer be accessible. For example, terminating the access can include the locking mechanism or other element of the secured compartment adjusting a setting to electronically enable the lock of the secured compartment. The access may be terminated based on a determination that the item associated with the service request has been retrieved from the secured compartment. Alternatively, the access may be terminated based on a determination that a threshold amount of time has elapsed since the access was granted. As a further alternative, the access may be terminated based on a determination that a user of the client device 1004 is no longer within a range of the intermediary control device 1002 and/or of the secured compartment 1000 (e.g., the range 110 shown in FIG. 1).

At 1312, a response to the request is output. The response indicates whether the request has been successfully completed. For example, the response may include a message indicating that the request has been successfully completed based on a determination that the item associated with the request has been retrieved from the secured compartment. In such a case, the response may further include data indicating a change in a user account associated with the request (e.g., a credit balance of the user account). Otherwise, the response may include a message indicating that the request has not been successfully completed.

In some implementations, the access to the secured compartment is granted responsive to verifying a proximity of the client device with respect to the intermediary control device. For example, a beacon device associated with the intermediary control device can transmit a signal which may be received at the client device. The client device may transmit a response to the signal. Proximity data generated based on that response can indicate whether the client device is within a range of the intermediary control device (e.g., the range 110 shown in FIG. 1).

Prior to granting the access to the secured compartment, the application software running at the intermediary control device can verify the proximity of the client device with respect to the intermediary control device using the proximity data. The proximity is verified where the proximity data indicates that the client device is within the range of the intermediary control device. Where the proximity is not verified, the access to the secured compartment may not be granted.

In some such implementations, the signal can be transmitted from the beacon device before the request is received from the client device (or at the intermediary control device, as the case may be). In other such implementations, the signal can be transmitted from the beacon device in response to the request. For example, after receiving the request, the intermediary control device can cause the beacon device to transmit the signal, such as using a command.

In some implementations, granting the access to the secured compartment may include indicating the access. For example, a message indicating that the access to the secured compartment has been granted may be output for display at the intermediary control device and/or at the client device. For example, the intermediary control device or a beacon device (e.g., in implementations in which the beacon device is used) may generate and transmit the message responsive to receiving confirmation that a locking mechanism of the secured compartment is unlocked. In some such implementations, a similar message may be indicated when the access to the secured compartment is subsequently terminated.

The implementations of this disclosure can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "mechanism," "module," or "monitor" as used herein and in the figures may be understood as corresponding to a functional unit implemented using software, hardware (e.g., an integrated circuit, such as an ASIC), or a combination of software and hardware. In certain contexts, such mechanisms, modules, or monitors may be understood to be a processor-implemented software mechanism, processor-implemented software module, or software-implemented monitor that is part of or callable by an executable program, which may itself be wholly or partly composed of such linked mechanisms, modules, or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While this disclosure has been described in connection with certain implementations, it is to be understood that this disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system, comprising:
a secured compartment configured to store an item available for purchase via a self-service market transaction;
an intermediary control device including a memory and a processor configured to execute instructions stored in the memory to facilitate the self-service market transaction; and
a beacon device including hardware and configured to detect a proximity of a client device to the intermediary control device,
wherein, to facilitate the self-service market transaction, the processor is configured to execute the instructions to cause the intermediary control device to:
receive, from a mobile device, a request for the self-service market transaction;
transmit, to the beacon device and based on receipt of the request, a command to cause the beacon device to transmit a signal;
receive proximity data from the beacon device, the proximity data comprising data generated by the beacon device based on a response, to the signal, transmitted to the beacon device from the mobile device;
determine, based on the proximity data, whether the mobile device is within a threshold proximity of the intermediary control device;
responsive to a determination that the mobile device is beyond the threshold proximity of the intermediary control device, deny the request; and responsive to a determination that the mobile device is within the threshold proximity of the intermediary control device, process the request to:
cause the secured compartment to unlock to grant access to the secured compartment for retrieval of the item; and
cause, based on a termination of the access to the secured compartment, the secured compartment to lock to restrict access to the secured compartment.

2. The system of claim 1, wherein the processor is configured to execute the instructions to:
determine, using one or more sensors, that a person has approached the secured compartment.

3. The system of claim 2, wherein the secured compartment includes the one or more sensors.

4. The system of claim 1, wherein the termination of the access to the secured compartment is based on one or more of a determination that the mobile device has moved beyond the threshold proximity of the intermediary control device, a determination that the item has been removed from the secured compartment, or a determination that a time period available for the access to the secured compartment has elapsed.

5. The system of claim 1, wherein the proximity data is generated based on the response to the signal including an identifier of the beacon device.

6. The system of claim 1, wherein the intermediary control device includes the beacon device.

7. The system of claim 1, wherein the secured compartment is one of a lockable pantry, a lockable refrigerator, a lockable freezer, a lockable drawer, a lockable shelf, a lockable desk, a lockable cabinet, or a lockable table.

8. A system, comprising:
a secured compartment configured to store an item available for purchase via a self-service market transaction;
an intermediary control device including a memory and a processor configured to execute instructions stored in the memory to facilitate the self-service market transaction; and
a beacon device including hardware and configured to detect a proximity of a client device to the intermediary control device, wherein, to facilitate the self-service market transaction, the processor is configured to execute the instructions to cause the intermediary control device to:
receive, from a mobile device, a request for the self-service market transaction;
cause, based on receipt of the request, the beacon device to transmit a signal;
receive proximity data from the beacon device, the proximity data comprising data generated by the beacon device based on a response, from the mobile device, to the signal;
determine, based on the proximity data, whether the mobile device is within a threshold proximity of the intermediary control device;
responsive to a determination that the mobile device is beyond the threshold proximity of the intermediary control device, deny the request; and
responsive to a determination that the mobile device is within the threshold proximity of the intermediary control device, process the request to:
cause the secured compartment to unlock to grant access to the secured compartment for retrieval of the item; and cause, based on a termination of the access to the secured compartment, the secured compartment to lock to restrict access to the secured compartment.

9. The system of claim 8, wherein the intermediary control device includes the beacon device.

10. The system of claim 8, wherein the intermediary control device is configured to use a sensor to determine that a person has approached the secured compartment.

11. The system of claim 8, wherein the termination of the access to the secured compartment is based on one or more of a determination that the mobile device has moved beyond the threshold proximity of the intermediary control device, a determination that the item has been removed from the secured compartment, or a determination that a time period available for the access to the secured compartment has elapsed.

12. The system of claim 8, wherein the secured compartment is one of a lockable pantry, a lockable refrigerator, a lockable freezer, a lockable drawer, a lockable shelf, a lockable desk, a lockable cabinet, or a lockable table.

13. A system, comprising:

an intermediary control device including a memory and a processor configured to execute instructions stored in the memory to:

receive, from a mobile device, a request associated with a self-service market transaction;

cause, based on receipt of the request, a beacon device to transmit a signal;

receive proximity data from the beacon device, the proximity data comprising data generated by the beacon device based on a response, from the mobile device, to the signal;

determine, based on the proximity data, whether the mobile device is within a threshold proximity of the intermediary control device;

responsive to a determination that the mobile device is beyond the threshold proximity of the intermediary control device, deny the request; and responsive to a determination that the mobile device is within the threshold proximity of the intermediary control device, process the request to:

cause a secured compartment that stores an item to unlock to grant access to the secured compartment for retrieval of the item; and cause, based on a termination of the access to the secured compartment, the secured compartment to lock to restrict access to the secured compartment.

14. The system of claim 13, wherein the processor is configured to execute the instructions to:

transmit, to the beacon device and based on receipt of the request, a command to cause the beacon device to transmit the signal.

15. The system of claim 13, wherein the processor is configured to execute the instructions to:

cause a database associated with an inventory for the item to update based on the retrieval of the item from the secured compartment.

16. The system of claim 13, wherein the secured compartment is identified from amongst multiple secured compartments associated with the intermediary control device based on an indication of the item in connection with the request.

17. The system of claim 13, wherein the termination of the access to the secured compartment is based on one or more of a determination that the mobile device has moved beyond the threshold proximity of the intermediary control device, a determination that the item has been removed from the secured compartment, or a determination that a time period available for the access to the secured compartment has elapsed.

18. The system of claim 14, wherein the secured compartment is one of a lockable pantry, a lockable refrigerator, a lockable freezer, a lockable drawer, a lockable shelf, a lockable desk, a lockable cabinet, or a lockable table.

\* \* \* \* \*